US012435851B2

(12) United States Patent
Ikuta et al.

(10) Patent No.: US 12,435,851 B2
(45) Date of Patent: Oct. 7, 2025

(54) LAMP FITTING, AND VEHICULAR HEADLAMP

(71) Applicant: KOITO MANUFACTURING CO., LTD., Tokyo (JP)

(72) Inventors: Ryujiro Ikuta, Shizuoka (JP); Shuhei Nozue, Shizuoka (JP); Yasutaka Katsuura, Shizuoka (JP); Ryosuke Utsumi, Shizuoka (JP); Kazuma Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/703,148

(22) PCT Filed: Oct. 13, 2022

(86) PCT No.: PCT/JP2022/038169
§ 371 (c)(1),
(2) Date: Apr. 19, 2024

(87) PCT Pub. No.: WO2023/068153
PCT Pub. Date: Apr. 27, 2023

(65) Prior Publication Data
US 2024/0410544 A1 Dec. 12, 2024

(30) Foreign Application Priority Data
Oct. 20, 2021 (JP) ................................ 2021-172004
Oct. 20, 2021 (JP) ................................ 2021-172005
(Continued)

(51) Int. Cl.
*F21S 41/39* (2018.01)
*F21S 41/151* (2018.01)
(Continued)

(52) U.S. Cl.
CPC ............. *F21S 41/39* (2018.01); *F21S 41/151* (2018.01); *F21S 41/192* (2018.01);
(Continued)

(58) Field of Classification Search
CPC .......... F21S 41/39; F21S 45/49; F21S 41/151; F21S 41/663; F21S 41/147; F21S 41/143;
(Continued)

(56) References Cited

U.S. PATENT DOCUMENTS

2009/0046469 A1* 2/2009 Yang ..................... H05K 3/325 362/310
2013/0271997 A1* 10/2013 Kim ......................... F21K 9/00 362/373
(Continued)

FOREIGN PATENT DOCUMENTS

CN 112113182 A 12/2020
DE 10 2017 208 984 A1 11/2017
(Continued)

OTHER PUBLICATIONS

Search English translation of WO-2022239814-A1 (Year: 2022).*
(Continued)

*Primary Examiner* — Omar Rojas Cadima
(74) *Attorney, Agent, or Firm* — Sughrue Mion, PLLC

(57) ABSTRACT

A vehicular headlamp (1) serving as a lamp fitting includes: a board (40) on which a first light source (41) and a second light source (42) are mounted; a heat sink (20); and a reflector unit (50) that presses the board (40) against the heat sink (20) and reflects a part of light emitted from the first light source (41) and the second light source (42), in which the board (40) has recesses (45) which are recessed portions of side surfaces (40*sf*) facing each other, the first light source (41) and the second light source (42) are positioned at inner positions with respect to a bottom portion (45B) of each of
(Continued)

the recesses (45), and the reflector unit (50) presses parts of the board (40) that are positioned at outer positions with respect to the bottom portion (45B) of each of the recesses (45).

3 Claims, 25 Drawing Sheets

(30) Foreign Application Priority Data

Oct. 22, 2021 (JP) ................................. 2021-173287
Oct. 22, 2021 (JP) ................................. 2021-173288

(51) Int. Cl.

| | |
|---|---|
| ***F21S 41/19*** | (2018.01) |
| ***F21S 41/255*** | (2018.01) |
| ***F21S 41/29*** | (2018.01) |
| ***F21S 41/36*** | (2018.01) |
| ***F21S 41/663*** | (2018.01) |
| ***F21S 45/47*** | (2018.01) |
| ***F21S 45/49*** | (2018.01) |
| *F21W 102/13* | (2018.01) |
| *F21W 102/155* | (2018.01) |
| *F21Y 115/10* | (2016.01) |

(52) U.S. Cl.
CPC ........... *F21S 41/255* (2018.01); *F21S 41/295* (2018.01); *F21S 41/36* (2018.01); *F21S 41/663* (2018.01); *F21S 45/47* (2018.01); *F21S 45/49* (2018.01); *F21W 2102/13* (2018.01); *F21W 2102/155* (2018.01); *F21Y 2115/10* (2016.08)

(58) Field of Classification Search
CPC ........ F21S 41/36; F21S 41/321; F21S 41/323; F21S 45/47; F21W 2102/13; F21Y 2115/10
See application file for complete search history.

(56) References Cited

U.S. PATENT DOCUMENTS

| | | | | |
|---|---|---|---|---|
| 2015/0224915 | A1 | 8/2015 | Sazuka | |
| 2015/0323159 | A1 | 11/2015 | Dinant et al. | |
| 2016/0131324 | A1 * | 5/2016 | Windgruber ............ | F21S 45/47 362/509 |
| 2017/0059109 | A1 | 3/2017 | Matsumoto et al. | |
| 2017/0130924 | A1 | 5/2017 | Kawai et al. | |
| 2017/0343173 | A1 | 11/2017 | Takada et al. | |
| 2018/0087730 | A1 | 3/2018 | Dubuc et al. | |
| 2021/0010651 | A1 | 1/2021 | Suetsugu et al. | |

FOREIGN PATENT DOCUMENTS

| | | | |
|---|---|---|---|
| EP | 2 730 837 | A1 | 5/2014 |
| EP | 3 379 139 | A1 | 9/2018 |
| EP | 3 004 724 | B1 | 11/2018 |
| JP | 2014-120275 | A | 6/2014 |
| JP | 2015-167123 | A | 9/2015 |
| JP | 2017-45616 | A | 3/2017 |
| JP | 2017-168274 | A | 9/2017 |
| JP | 2019-46713 | A | 3/2019 |
| JP | 2019-46714 | A | 3/2019 |
| JP | 2020-205207 | A | 12/2020 |
| WO | 2016/013447 | A1 | 1/2016 |
| WO | 2019/177050 | A1 | 9/2019 |
| WO | 2021/025136 | A1 | 2/2021 |
| WO | WO-2022239814 | A1 * | 11/2022 |
| WO | 2023/048043 | A1 | 3/2023 |

OTHER PUBLICATIONS

International Search Report for International application No. PCT/JP2022/038169 dated Dec. 20, 2022.
Supplementary European Search Report dated Sep. 18, 2024 in Application No. 22883457.8.
Extended European Search Report dated Oct. 24, 2024 in Application No. 22883457.8.

* cited by examiner

LAMP FITTING, AND VEHICULAR HEADLAMP

This is a National Stage Application of International Application No. PCT/JP2022/038169 filed Oct. 13, 2022, claiming priority based on Japanese Patent Application Nos. 2021-172004 filed Oct. 20, 2021; 2021-172005 filed Oct. 20, 2021; 2021-173287 filed Oct. 22, 2021; and 2021-173288 filed Oct. 22, 2021.

TECHNICAL FIELD

The present invention relates to a lamp fitting and a vehicular headlamp.

BACKGROUND ART

A lamp fitting including a reflector unit for forming a predetermined light distribution pattern is known, and Patent Literature 1 below discloses such a lamp fitting.

The lamp fitting of Patent Literature 1 below includes a board on which a light source is mounted, a heat sink on which the board is disposed, and the reflector unit. The reflector unit reflects a part of light emitted from the light source in such a way as to form a predetermined light distribution pattern. The reflector unit presses a plurality of parts of the board to press the board against the heat sink, whereby the board is fixed to the heat sink.

In addition, the lamp fitting of Patent Literature 1 below is a vehicular headlamp, and includes a first light source, a second light source disposed below the first light source, a reflector unit disposed in front of a board, and a projection lens disposed in front of the reflector unit. The reflector unit includes a first reflector disposed between the first light source and the second light source, and a pair of second reflectors disposed above and below the first reflector. A part of light emitted from the first light source is directly incident on the projection lens through between the first reflector and the upper second reflector, another part of the light is reflected toward the projection lens by an upper surface of the first reflector, and still another part of the light is reflected toward the projection lens by the upper second reflector. Thus, the light emitted from the first light source and incident on the projection lens forms a low beam light distribution pattern having a cutoff line corresponding to a shape of a front end of the first reflector. In addition, a part of light emitted from the second light source is directly incident on the projection lens through between the first reflector and the lower second reflector, another part of the light is reflected toward the projection lens by a lower surface of the first reflector, and still another part of the light is reflected toward the projection lens by the lower second reflector. As described above, the light emitted from the second light source and incident on the projection lens forms an additional light distribution pattern, and the additional light distribution pattern and the low beam light distribution pattern form a high beam light distribution pattern. Therefore, the vehicular headlamp can switch light to be emitted between a low beam and a high beam by switching emission and non-emission of light of the second light source.

In addition, there is a vehicular headlamp including a light source, a projection lens that transmits emitted light and emits desired light, and a lens holder that holds the projection lens. Patent Literature 2 below discloses such a vehicular headlamp. In the vehicular headlamp, the lens holder is made of a resin, and a light blocking portion is provided between the projection lens and the lens holder in order to prevent the lens holder from being damaged due to concentration of sunlight entering the vehicular headlamp through the projection lens on the lens holder.

In addition, there is a vehicular headlamp in which a board on which a light source is mounted is disposed on a heat sink, so that heat generated from the light source is released from the heat sink, and Patent Literature 3 below discloses such a vehicular headlamp. In the vehicular headlamp, the board on which a light emitting element array including a plurality of light emitting diodes (LEDs) is mounted is disposed on the heat sink. Specifically, a rear surface of the board where the light emitting element array is mounted is disposed on a protruding board placement surface of the heat sink. Therefore, heat generated from the light emitting element array is conducted from the light emitting element array to the heat sink through the board, and is released from the heat sink.

[Patent Literature 1] WO 2019/177050 A1

[Patent Literature 2] JP 2017-45616 A

[Patent Literature 3] WO 2016/013447 A1

SUMMARY OF INVENTION

A lamp fitting according to a first aspect of the present invention includes: a board on which a light source is mounted; a heat sink on which the board is disposed; and a reflector unit that presses the board against the heat sink and reflects a part of light emitted from the light source, in which the board has recesses which are recessed portions of side surfaces facing each other, the light source is positioned at an inner position with respect to a bottom portion of each of the recesses, and the reflector unit presses parts of the board that are positioned at outer positions with respect to the bottom portion of each of the recesses.

In the lamp fitting according to the first aspect, as described above, the board has the recesses which are recessed portions of the side surfaces facing each other. Therefore, a strength of the parts of the board that are positioned at the outer positions with respect to the bottom portion of each of the recesses is weakened as compared with a case where the board does not have the recesses, and the reflector unit presses the parts having the weakened strength as described above. Therefore, with the lamp fitting according to the first aspect, it is possible to concentrate distortion of the board due to the pressing force of the reflector unit on the parts having the weakened strength, and it is thus possible to reduce distortion of an inner portion with respect to the bottom portion of the recess portion as compared with the above case. Further, in the lamp fitting according to the first aspect, as described above, the light source is positioned at an inner position with respect to the bottom portion of each of the recesses. Therefore, with the lamp fitting, it is possible to suppress a change in direction of the light source due to distortion of the board, and it is thus possible to more easily form a predetermined light distribution pattern as compared with the above case. Further, in the lamp fitting according to the first aspect, the reflector unit presses one recess side and the other recess side of the board. Therefore, with the lamp fitting according to the first aspect, it is possible to suppress misalignment between the board and the heat sink, and it is thus possible to more easily form a predetermined light distribution pattern as compared with a case where the reflector unit presses only one recess side of the board.

In the lamp fitting according to the first aspect, the reflector unit may press both sides of each of the recesses in the board.

With such a configuration, it is possible to suppress misalignment in the relative position between the board and the heat sink as compared with a case where the reflector unit presses only one side of each recess in the board.

In the lamp fitting according to the first aspect, the heat sink may have a protrusion inserted into each of the recesses.

With such a configuration, the board can be positioned with respect to the heat sink by the side surfaces of the board defining the recesses and an outer peripheral surface of the protrusion.

In the lamp fitting according to the first aspect, the reflector unit may have a flat facing surface facing the board and an opening penetrating from the facing surface to a surface opposite to the board, and the light source may overlap the opening.

With such a configuration, for example, the facing surface can be more easily formed by cutting as compared with a case where the facing surface is not flat.

In this case, the facing surface may extend to an outer edge of a surface of the reflector unit that is adjacent to the board.

With such a configuration, for example, the facing surface can be easily formed by cutting.

The lamp fitting according to the first aspect may further include a connector mounted on the board, in which the reflector unit may not be formed on a side opposite to the light source with respect to the connector.

With such a configuration, it is possible to more easily connect another connector to the connector as compared with a case where the reflector unit is formed on the side opposite to the light source with respect to the connector.

A vehicular headlamp according to a second aspect of the present invention includes: a first light source that emits light forming a low beam light distribution pattern from a planar emission surface; a second light source that is positioned below the first light source and emits, from a planar emission surface, light forming a high beam light distribution pattern with the light emitted from the first light source; a board on which the first light source and the second light source are mounted; a reflector unit that is disposed in front of the board; and a projection lens that is disposed in front of the reflector unit, in which the reflector unit includes a first reflector that is disposed between the first light source and the second light source and of which upper and lower surfaces are reflective surfaces, and a pair of second reflectors that are disposed above and below the first reflector, a perpendicular line for the emission surface of one light source of the first light source and the second light source extends away from the first reflector as the perpendicular line goes forward, and a perpendicular line for the emission surface of the other light source extends toward the first reflector as the perpendicular line goes forward, partial light of the light emitted from the one light source is directly incident on the projection lens through between one reflective surface of the first reflector and one second reflector, another partial light is reflected toward the projection lens at a part including a front end portion of the one reflective surface of the first reflector, and still another partial light is reflected by the one second reflector and reflected toward the projection lens at a part including the front end portion of the one reflective surface of the first reflector, and partial light of the light emitted from the other light source is directly incident on the projection lens through between the other reflective surface of the first reflector and the other second reflector, another partial light is reflected toward the projection lens at a part including a front end portion of the other reflective surface of the first reflector, and still another partial light is reflected toward the projection lens by the other second reflector.

In the vehicular headlamp according to the second aspect, the first light source and the second light source are mounted on the common board, and thus, the number of components can be reduced as compared with a case where the first light source and the second light source are mounted on different boards. Further, in the vehicular headlamp according to the second aspect, the perpendicular line for the emission surface of one of the first light source and the second light source extends away from the first reflector as the perpendicular line goes forward, unlike perpendicular lines for the emission surfaces of the first light source and the second light source of Patent Literature 1 described above. Therefore, a light flux of light emitted from the one light source and directly incident on the front end portion of the one reflective surface of the first reflector tends to decrease, and it is difficult to brighten the front end portion. However, not only the light but also light emitted from the one light source and reflected by the second reflector is incident on the front end portion of the one reflective surface of the first reflector together, and the rays of light are reflected toward the projection lens. Therefore, even with such one light source, it is possible to prevent the front end portion of the one reflective surface, which is the upper surface or the lower surface of the first reflector, from becoming dark. In addition, since the perpendicular line for the emission surface of the other light source extends toward the first reflector as the perpendicular line goes forward, the front end portion of the other reflective surface, which is the upper surface or the lower surface of the first reflector, can be brightened by the light from the other light source. Therefore, the vehicular headlamp according to the second aspect can suppress the front end portions of the upper surface and the lower surface of the first reflector from becoming dark. Therefore, with the vehicular headlamp according to the second aspect, it is possible to suppress the vicinity of a cutoff line of a low beam light distribution pattern and the vicinity of the center of a high beam light distribution pattern from becoming dark, and it is possible to suppress deterioration in visibility.

In the vehicular headlamp according to the second aspect, the one light source may be the first light source.

In the vehicular headlamp according to the second aspect, the still another partial light of the light emitted from the one light source may be reflected by the one second reflector toward the first reflector with a divergence angle smaller than that when the still another partial light is incident.

With such a configuration, in a case where the one light source is the first light source, it is possible to further suppress the vicinity of the cutoff line of the low beam light distribution pattern from becoming dark, and in a case where the one light source is the second light source, it is possible to further suppress the vicinity of the center of the high beam light distribution pattern from becoming dark.

In the vehicular headlamp according to the second aspect, the still another partial light of the light emitted from the other light source may be reflected by the other second reflector toward the projection lens with a divergence angle larger than that when the still another partial light is incident.

With such a configuration, in a case where the one light source is the first light source, the high beam light distribution pattern can be easily expanded upward, and in a case where the one light source is the second light source, the low beam light distribution pattern can be easily expanded downward.

The vehicular headlamp according to the second aspect may further include an integrated circuit that is mounted on the board and adjusts power supplied to at least one of the first light source or the second light source, in which the reflector unit may include a cover portion that covers the integrated circuit.

With such a configuration, it is possible to suppress the integrated circuit from being irradiated with sunlight or the like incident from the outside via the projection lens.

A vehicular headlamp according to a third aspect of the present invention includes: a light source; a reflector unit that includes a reflective portion that reflects, forward, light emitted from the light source forward and downward; a projection lens that transmits the light reflected by the reflective portion; and a conductive member that is disposed below the reflective portion, in which the reflector unit includes a light blocking cover formed integrally with the reflective portion and positioned between the projection lens and the conductive member below the reflective portion.

In the vehicular headlamp according to the third aspect, a light blocking member is disposed between the conductive member and the projection lens, and it is thus possible to suppress irradiation of the conductive member with sunlight incident through the projection lens. The reflective portion that reflects the light emitted from the light source usually has a light blocking property. Therefore, it is possible to suppress damage of the conductive members due to sunlight at low cost by integrating the light blocking cover and the reflective portion both having a light blocking property.

It is preferable that the vehicular headlamp according to the third aspect further includes a lens holder that includes a bottom plate portion extending from the light blocking cover toward the projection lens and holds the projection lens, in which the light blocking cover includes a plate-shaped cover portion extending in an extending direction of the bottom plate portion, and at least a part of a side surface of the plate-shaped cover portion overlaps the bottom plate portion in the extending direction.

In a case where the plate-shaped cover portion does not overlap the bottom plate portion in the extending direction and the plate-shaped cover portion is positioned on a level lower than the bottom plate portion, sunlight propagating toward the plate-shaped cover portion may damage the lens holder. In a case where the plate-shaped cover portion is positioned on a level higher than the bottom plate portion, sunlight propagating toward the plate-shaped cover portion is reflected by the entire side surface of the plate-shaped cover portion, and the reflected light can damage the lens holder. Therefore, as described above, at least a part of the side surface of the plate-shaped cover portion overlaps the bottom plate portion in the extending direction, and it is thus possible to suppress sunlight propagating toward the plate-shaped cover portion from damaging the lens holder.

It is preferable that a width of the bottom plate portion in a left-right direction is larger than a width of the plate-shaped cover portion in the left-right direction, and a recess into which a part of the plate-shaped cover portion enters is formed at an edge of the bottom plate portion that is adjacent to the plate-shaped cover portion.

As the part of the plate-shaped cover enters the recess of the bottom plate portion, it is possible to suppress misalignment between the reflector unit and the lens holder in the left-right direction.

It is preferable that an upper surface of the plate-shaped cover portion scatters and reflects incident light.

In this case, sunlight propagating toward the plate-shaped cover portion is scattered, and it is thus possible to suppress damage to other members due to reflection of the sunlight.

It is preferable that the light blocking cover includes a light scattering portion that scatters and reflects incident light between the reflective portion and the plate-shaped cover portion.

The plate-shaped cover portion and the reflective portion may be separated from each other due to a position where the conductive member is disposed. With the above configuration, sunlight propagating between the plate-shaped cover portion and the reflective portion is scattered, and it is thus possible to suppress damage to other members due to reflection of the sunlight.

In this case, it is preferable that the width of the plate-shaped cover portion in the left-right direction is larger than a width of the light scattering portion in the left-right direction, and each of end portions of the plate-shaped cover portion in the left-right direction extends rearward from the light scattering portion.

With such a configuration, a range of the conductive member that can be protected by the plate-shaped cover portion can be widened.

Further, it is preferable that the light blocking cover includes a side cover portion extending rearward and upward from a rear end of each of the end portions.

With such a configuration, the range of the conductive member that can be protected by the light blocking cover can be further widened.

A vehicular headlamp according to a fourth aspect of the present invention includes: a board on which a light source and an integrated circuit that performs switching of power supply to the light source are mounted; and a heat sink on which the board is disposed, in which a board facing region of the heat sink that faces the board includes a separated portion that is separated from the board, and a disposition portion that protrudes toward the board from the separated portion and on which the board is disposed, and the disposition portion includes a light source facing region that faces a rear surface of a region of the board in which the light source is mounted, an integrated circuit facing region that faces a rear surface of a region of the board in which the integrated circuit is mounted, and a first coupling region that couples the light source facing region and the integrated circuit facing region.

With the vehicular headlamp according to the fourth aspect, heat the light source and the integrated circuit is conducted mainly from the light source facing region and the integrated circuit facing region to the heat sink via the board, and is dissipated. By the way, as heat generated from the light source and the integrated circuit is conducted through the board, a region between a region where the light source is mounted and a region where the integrated circuit is mounted in the board may be heated. With the vehicular headlamp, heat in this region can be conducted from the first coupling region to the heat sink to dissipate heat. In addition, as the separated portion is provided, it is possible to suppress unnecessary return of the heat conducted to the heat sink from the heat sink to the board. Therefore, the vehicular headlamp according to the fourth aspect can efficiently release heat.

In addition, the light source may include a plurality of light emitting elements arranged in parallel, the light source facing region may extend in a parallel arrangement direction of the plurality of light emitting elements, and the integrated circuit facing region may overlap a straight line orthogonal to a line segment connecting the light emitting elements positioned at both ends.

With such a configuration, an extending direction of the light source facing region and an extending direction of a region including the integrated circuit facing region and the first coupling region can be orthogonal to each other. Therefore, the board can be stably disposed on the heat sink.

Further, it is preferable that the separated portion is positioned on both sides of the first coupling region in the parallel arrangement direction.

With such a configuration, heat conducted to the heat sink can be further suppressed from returning to the board as compared with a case where the separated portion is not positioned on both sides of the first coupling region.

Furthermore, it is preferable that the disposition portion includes an adjustment region that extends in the parallel arrangement direction over a width larger than a width of the integrated circuit facing region on a side opposite to the light source facing region with respect to the integrated circuit facing region, and a second coupling region that couples the adjustment region and the integrated circuit facing region.

In this case, the board can be more stably disposed on the heat sink by interposing the integrated circuit facing region between the light source facing region and the adjustment region extending in the same direction.

DESCRIPTION OF EMBODIMENTS

Figure 1:
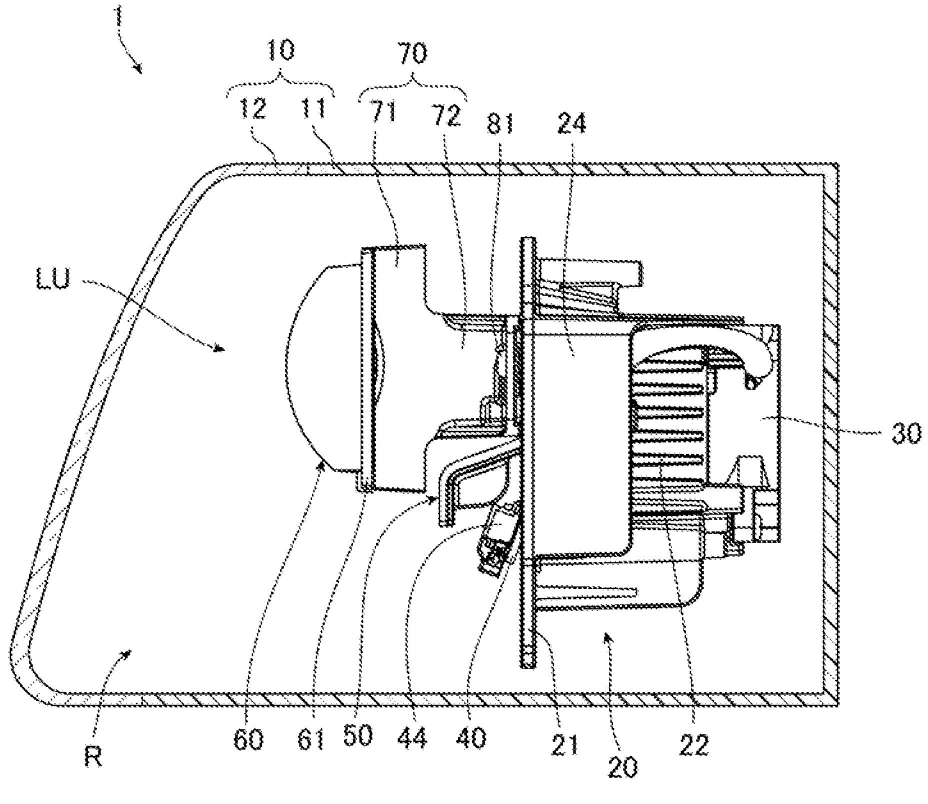
FIG. 1 is a view schematically illustrating a lamp fitting according to a first embodiment as a first aspect and a second aspect of the present invention.

Hereinafter, modes for implementing a lamp fitting and a vehicular headlamp according to the present invention will be exemplified with reference to the accompanying drawings. Embodiments exemplified below are intended to facilitate understanding of the present invention and are not intended to limit the present invention. The present invention can be changed and modified without departing from the gist of the present invention. In the present invention, constituent elements in the following embodiments may be appropriately combined. In the drawings referred to below, dimensions of each member may be changed for easy understanding.

First Embodiment

A first embodiment as a first aspect and a second aspect of the present invention will be described. FIG. 1 is a view schematically illustrating a lamp fitting according to the present embodiment, and is a view schematically illustrating a cross section of the lamp fitting in a vertical direction. The lamp fitting according to the present embodiment is a vehicular headlamp, and is for an automobile. The vehicular headlamp is generally provided at each of left and right portions on a front side of a vehicle. In the present specification, “right” refers to a right side in a forward movement direction of the vehicle, and “left” refers to a left side in the forward movement direction of the vehicle. Each of the left and right vehicular headlamps has the same configuration except that shapes thereof are substantially symmetrical to each other in a left-right direction. Therefore, one vehicular headlamp will be described below.

As illustrated in FIG. 1, a vehicular headlamp 1 according to the present embodiment includes a housing 10 and a lamp fitting unit LU as main components. FIG. 1 is a side view of the vehicular headlamp 1, and in FIG. 1, a cross section of the housing 10 is illustrated for easy understanding.

The housing 10 includes a lamp housing 11 and a light transmissive front cover 12. A front side of the lamp housing 11 is opened, and the front cover 12 is fixed to the lamp housing 11 in such a way as to close the opening. A space formed by the lamp housing 11 and the front cover 12 is a lamp room R, and the lamp unit LU is housed in the lamp room R.

Figure 2:
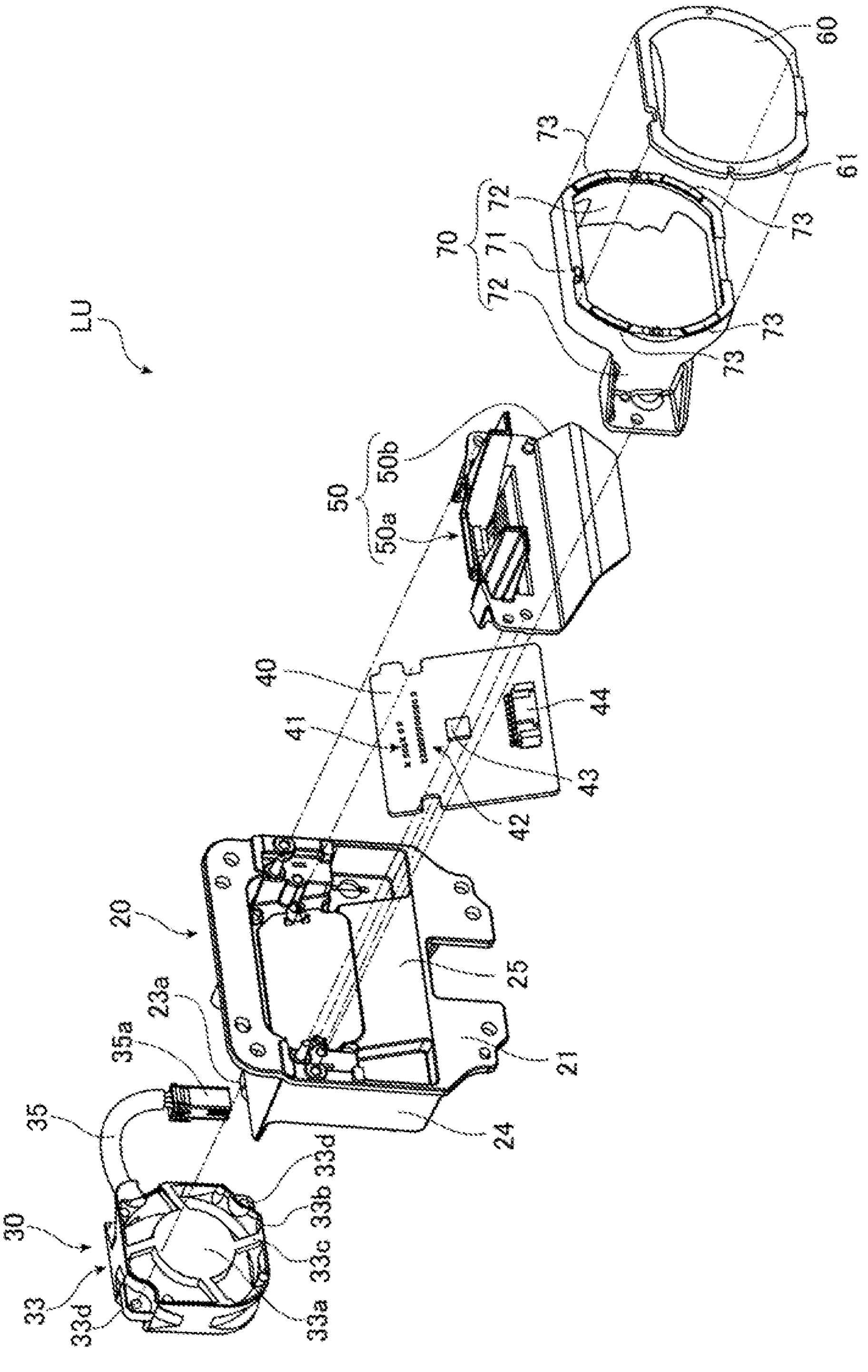
FIG. 2 is an exploded perspective view of a lamp fitting unit as viewed from the front and obliquely above.
Figure 3:
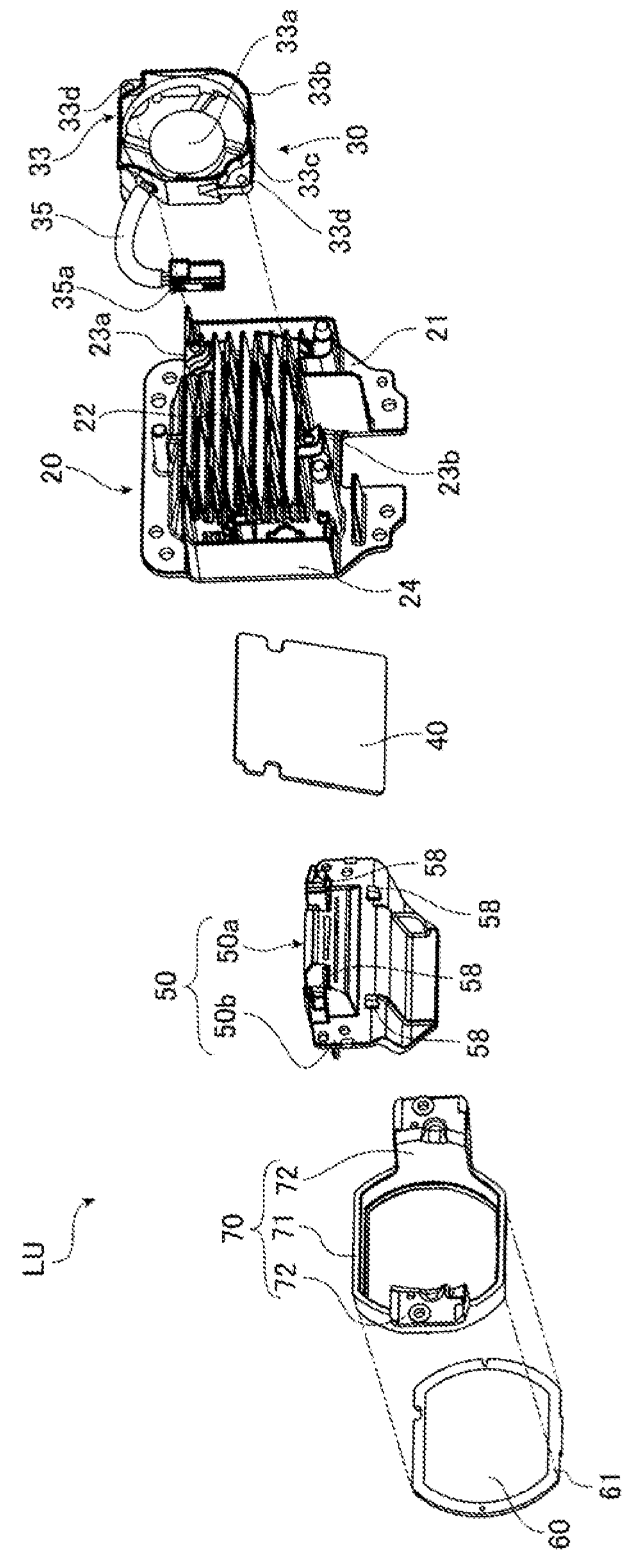
FIG. 3 is an exploded perspective view of the lamp fitting unit as viewed from the rear and obliquely below.
Figure 4:
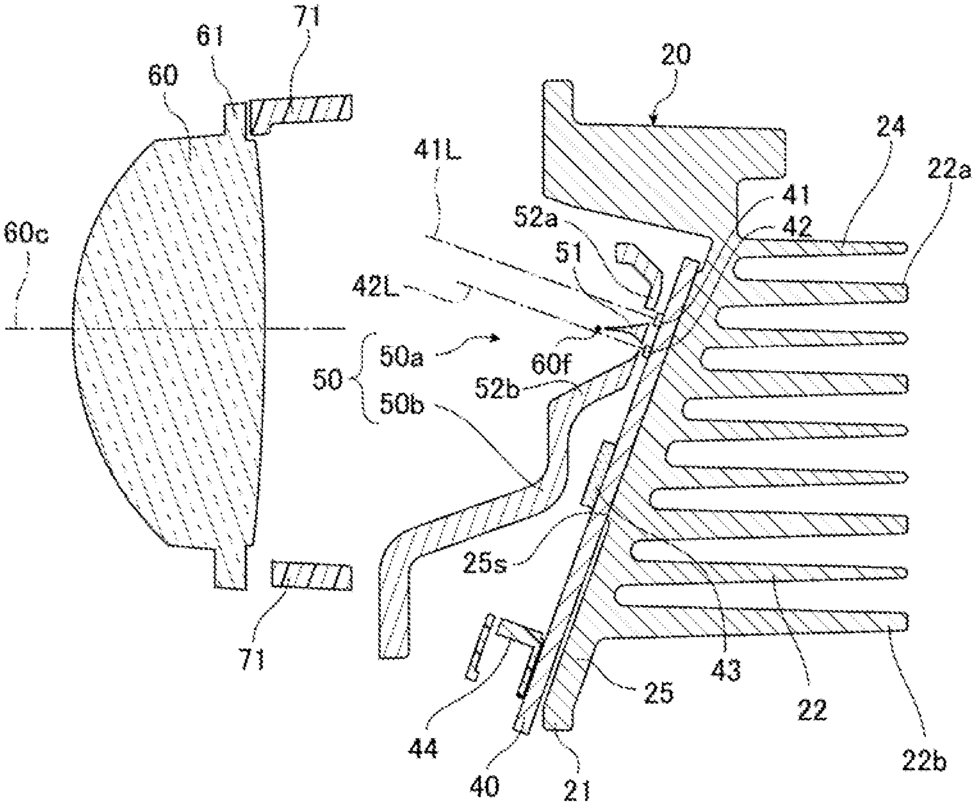
FIG. 4 is a vertical cross-sectional view of the lamp fitting unit.

FIG. 2 is an exploded perspective view of the lamp fitting unit LU as viewed from the front and obliquely above. FIG. 3 is an exploded perspective view of the lamp fitting unit LU as viewed from the rear and obliquely above. FIG. 4 is a vertical cross-sectional view of the lamp fitting unit LU. As illustrated in FIGS. 1 to 4, the lamp fitting unit LU according to the present embodiment mainly includes a heat sink 20, a fan 30 that is an axial fan, a board 40, a reflector unit 50, a projection lens 60, and a holder 70. FIG. 4 is a vertical cross-sectional view of the lamp fitting unit LU along an optical axis of the projection lens 60 described below, and a description of the fan 30 is omitted in FIG. 4.

Figure 5:
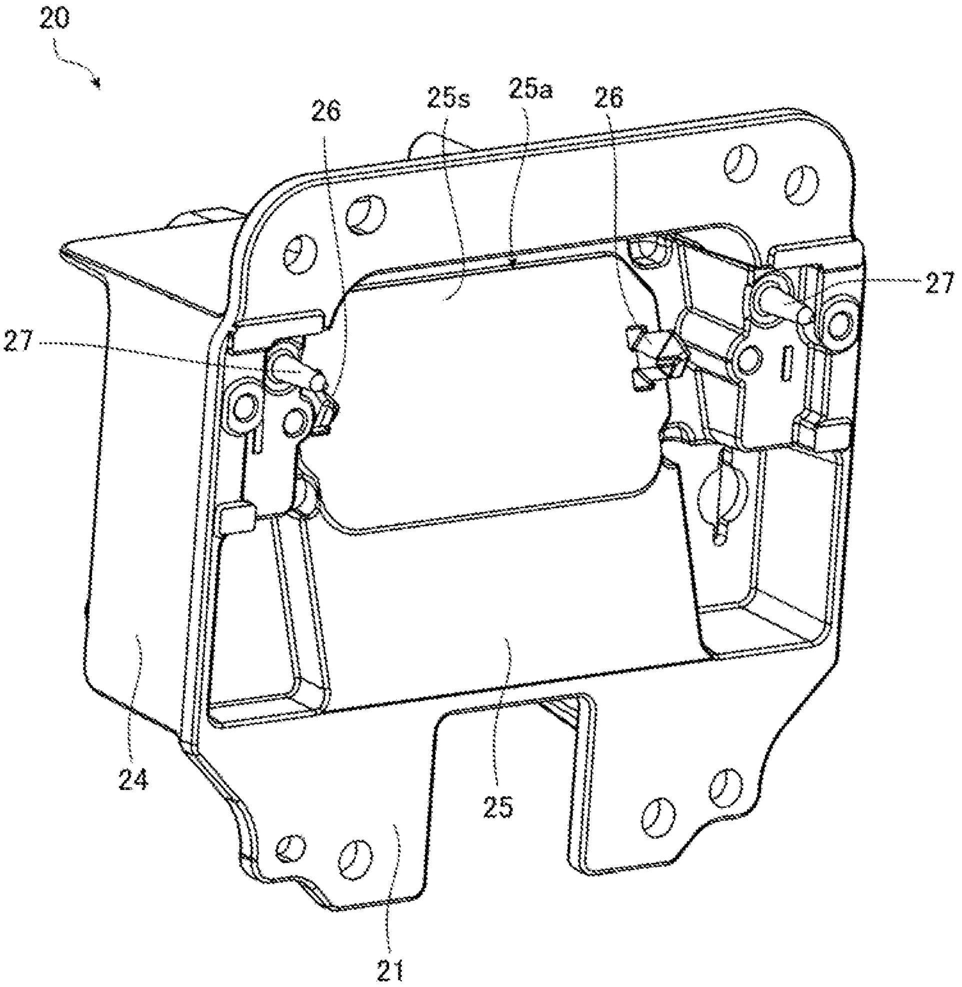
FIG. 5 is a perspective view of a heat sink as viewed from the front and obliquely above.

FIG. 5 is a perspective view of the heat sink 20 as viewed from the front and obliquely above. The heat sink 20 is made of a material having excellent heat dissipation properties, such as metal. As illustrated in FIGS. 2 to 5, the heat sink 20 according to the present embodiment mainly includes a base plate 21 on which the board 40 is disposed, a plurality of heat dissipation fins 22, a plurality of attachment bosses 23*a* and 23*b*, and a peripheral wall portion 24.

The base plate 21 is a plate-shaped member having a front surface positioned on a front side and a rear surface positioned on a rear side, and has an inclined portion 25 inclined toward the rear side in an upward direction. The inclined portion 25 includes a pedestal 25*a* protruding forward, and an end surface 25*s* of the pedestal 25*a* is a flat surface inclined toward the rear side in the upward direction. The board 40 is disposed on the end surface 25*s*. Protrusions 26 protruding forward are provided on both left and right sides of the pedestal 25*a*. Pins 27 protruding forward are provided to the right and left of the pedestal 25*a* of the base plate 21.

The plurality of heat dissipation fins 22, the attachment bosses 23*a* and 23*b*, and the peripheral wall portion 24 are disposed on the rear surface of the base plate 21 on a side opposite to the board 40, extend rearward, and are formed integrally with the base plate 21. The fan 30 is disposed behind the plurality of heat dissipation fins 22, and is fixed to the attachment bosses 23*a* and 23*b*. The heat sink 20 is cooled by air blown by the fan 30. A rear surface side of the heat sink 20 on which the plurality of heat dissipation fins 22, the attachment bosses 23*a* and 23*b*, the peripheral wall portion 24, and the fan 30 are disposed is described below.

Figure 6:
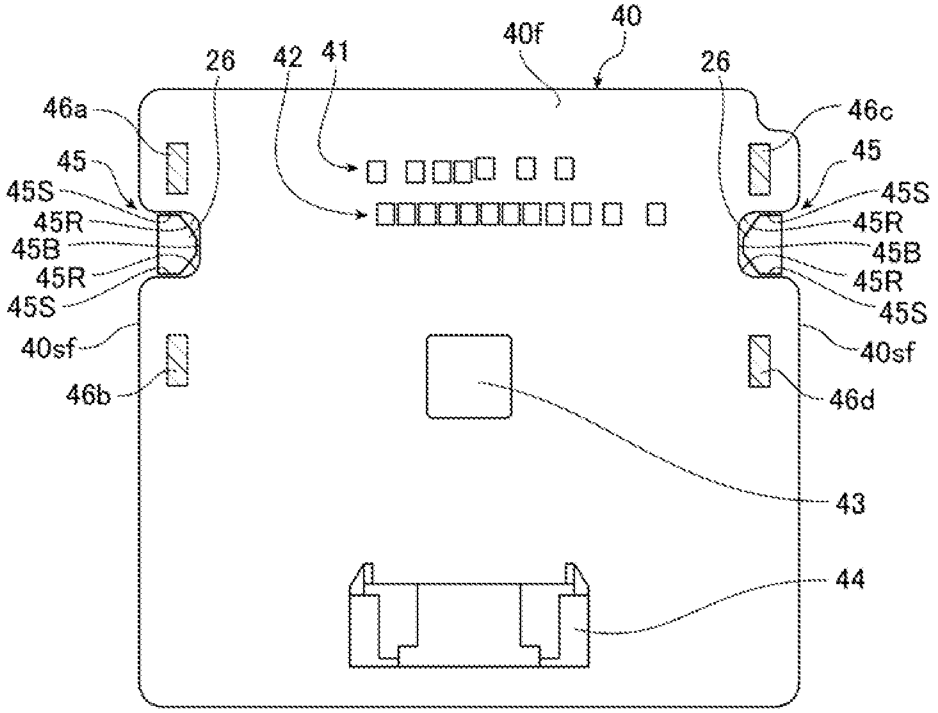
FIG. 6 is a front view schematically illustrating a board.

The board 40 is, for example, a flat-plate-shaped member made of metal, and is disposed on the end surface 25*s* of the pedestal 25*a* of the heat sink 20 as described above. FIG. 6 is a front view schematically illustrating the board 40. As illustrated in FIG. 6, in the present embodiment, an outer shape of the board 40 is a substantially bilaterally symmetrical quadrangular shape, and the board 40 has a pair of recesses 45 which are recessed portions of left and right side surfaces 40*sf* facing each other. The recess 45 has a substantially quadrangular shape, and a portion of the side surface 40*sf* of the board 40 corresponding to the recess 45 has a pair of linear portions 45S extending in a left-right direction and facing each other, a bottom portion 45B that is a distal end in a recessed direction and extends in the vertical direction, and corner portions 45R connecting the linear portions 45S and the bottom portion 45B. The protrusions 26 of the heat sink 20 are inserted into the recesses 45, respectively. FIG. 6 illustrates the protrusions 26. Movement of the board 40 in the vertical direction along the end surface 25*s* is restricted by the pair of linear portions 45S of the recess 45 and an outer peripheral surface of the protrusion 26. In addition, movement of the board 40 in the left-right direction along the end surface 25*s* is restricted by the bottom portion 45B of one recess 45 and the outer peripheral surface of one protrusion 26, and the bottom portion 45B of the other recess 45 and the outer peripheral surface of the other protrusion 26. In this manner, the movement of the board 40 along the end surface 25*s* is restricted by the recesses 45 and the protrusions 26, and the board 40 is positioned with respect to the heat sink 20. A shape of the recess 45 is not particularly limited. Further, the protrusion 26 may be press-fitted into the recess 45.

In the present embodiment, a first light source 41, a second light source 42, an integrated circuit 43, and a connector 44 are mounted on a front surface 40*f* of the board 40.

The first light source 41 emits light forming a low beam light distribution pattern from a planar emission surface. The second light source 42 emits light forming a high beam light distribution pattern together with the light emitted from the first light source 41 from a planar emission surface. In the present embodiment, the first light source 41 and the second light source 42 are light emitting diode (LED) arrays each including a plurality of LEDs arranged in the left-right direction, and are disposed at inner positions with respect to the bottom portions 45B of the recesses 45. In the present embodiment, the second light source 42 is positioned below the first light source and overlaps the recesses 45 in the left-right direction that is a direction in which the plurality of LEDs are arranged.

The integrated circuit 43 is disposed below the second light source 42, and the connector 44 is disposed below the integrated circuit 43. A circuit (not illustrated) is provided on the board 40, and the connector 44 and the first light source 41, the connector 44 and the integrated circuit 43, and the integrated circuit 43 and the second light source 42 are connected by the circuit. Power is supplied to the connector 44 from a power supply unit (not illustrated). Therefore, power is supplied from the connector 44 to the first light source 41, and power is supplied from the connector 44 to the second light source 42 via the integrated circuit 43. The integrated circuit 43 includes a plurality of switch elements, and can individually adjust power supplied to each LED of the second light source 42. The configuration of the integrated circuit 43 is not particularly limited as long as the integrated circuit 43 can adjust power supplied to at least one of the first light source 41 or the second light source 42. In addition, the disposition of the integrated circuit 43 and the connector 44 is not particularly limited. Further, the integrated circuit 43 does not have to be mounted on the board 40, and in this case, the connector 44 and the second light source 42 are connected by the circuit.

When the board 40 is viewed from the front, a part of the board 40 on which the first light source 41, the second light source 42, and the integrated circuit 43 are mounted overlaps with the end surface 25*s*. In addition, since the end surface 25*s* is inclined toward the rear side in the upward direction as described above, the board 40 is also inclined in the same manner, and the front surface 40*f* is directed toward the front side in an obliquely upward direction. A perpendicular line 41L for the emission surface of the first light source 41 and a perpendicular line 42L for the emission surface of the second light source 42 are substantially perpendicular to the front surface 40*f* of the board 40. For this reason, the perpendicular line 41L and the perpendicular line 42L are directed toward the front side in the obliquely upward direction. The perpendicular line 41L and the perpendicular line 42L illustrated in FIG. 4 are the same as a straight line which passes through the center of the emission surface, is parallel to an emission direction of light having the highest intensity among rays of light emitted from the light source, and passes through a part where the light is emitted in the emission surface.

Figure 7:
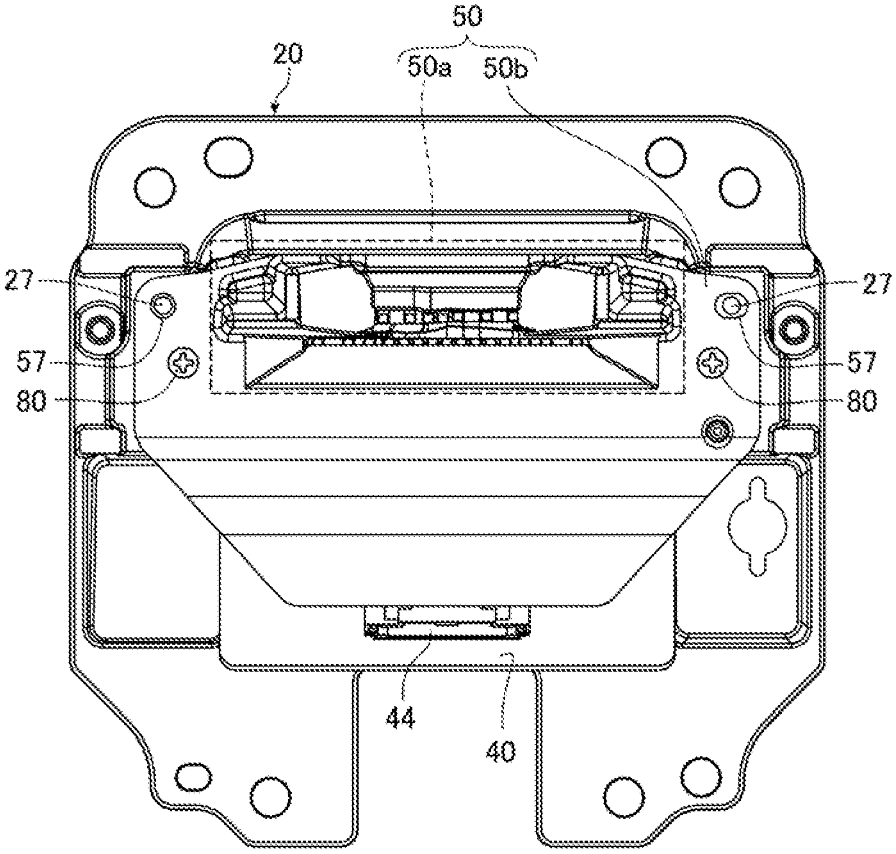
FIG. 7 is a front view of a reflector unit attached to the heat sink as viewed from the front.

FIG. 7 is a front view of the reflector unit 50 attached to the heat sink 20 as viewed from the front, and is a view when viewed along the optical axis of the projection lens 60 described below. As illustrated in FIGS. 4 and 7, the reflector unit 50 is disposed in front of the board 40, and the board 40 is pinched between the reflector unit 50 and the heat sink 20. The reflector unit 50 according to the present embodiment includes a light distribution forming portion 50*a* and a cover portion 50*b* connected to both left and right sides and a lower side of the light distribution forming portion 50*a*, and the light distribution forming portion 50*a* and the cover portion 50*b* are integrally formed. In FIG. 7, the light distribution forming portion 50*a* is surrounded by a broken line. In the present embodiment, the reflector unit 50 is fixed to the heat sink 20 by fixing the cover portion 50*b* to the heat sink 20 with a screw 80. Examples of a material of the reflector unit 50 include plated metal, and the reflector unit 50 is formed by, for example, cutting and plating a metal member obtained by casting.

Figure 8:
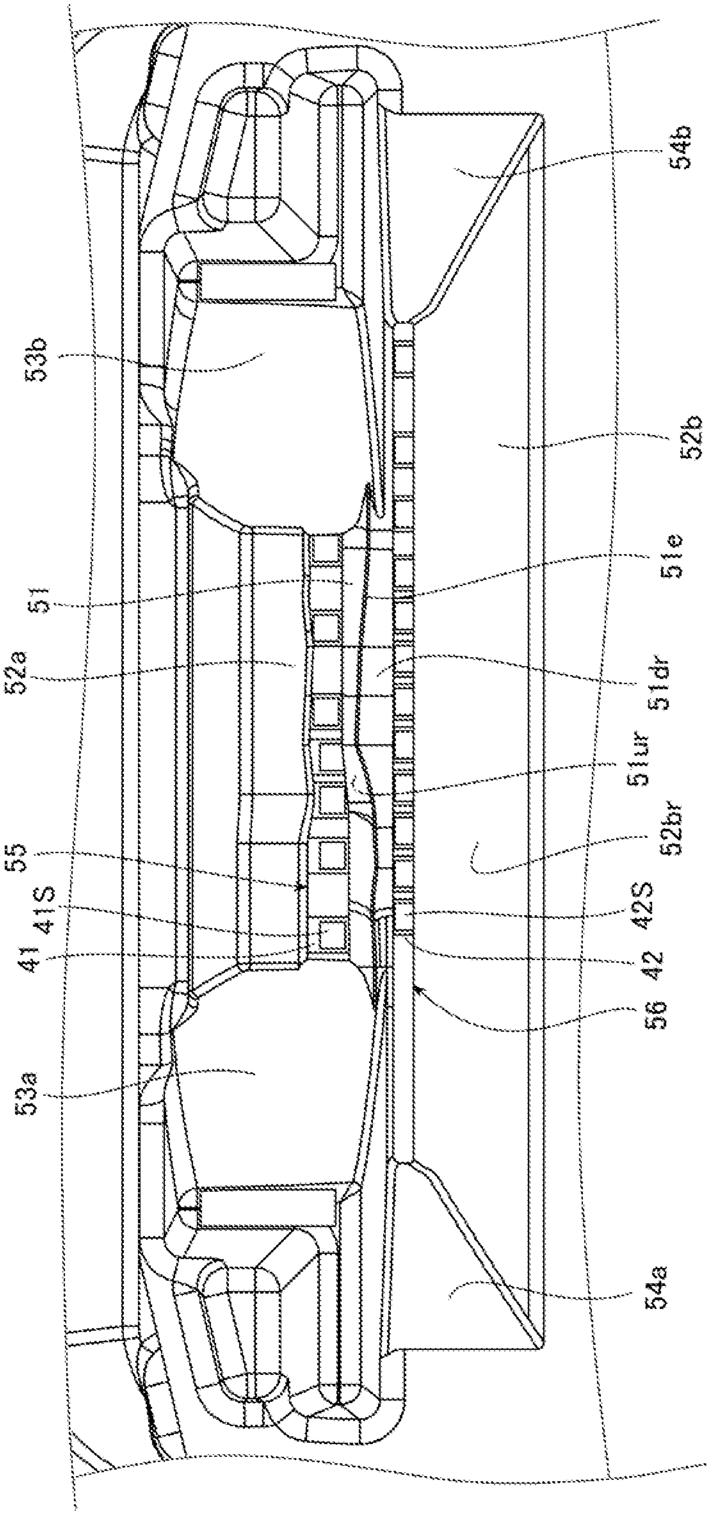
FIG. 8 is an enlarged view of a part including a light distribution forming portion of FIG. 7.
Figure 9:
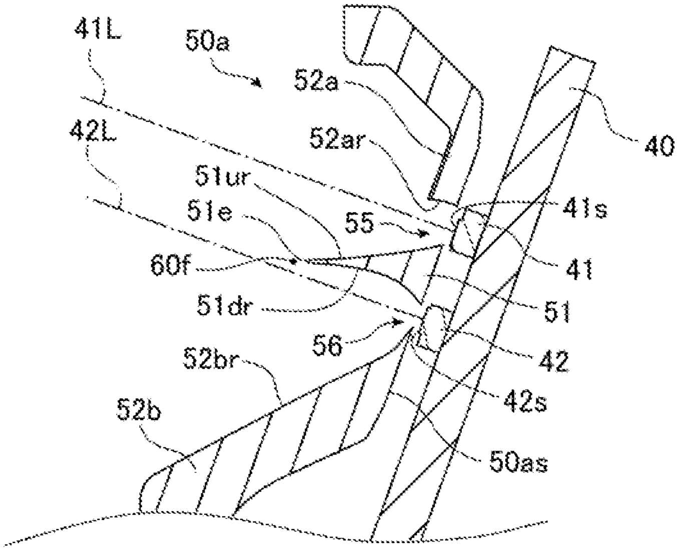
FIG. 9 is an enlarged view of a part including the light distribution forming portion of FIG. 4.

FIG. 8 is an enlarged view illustrating a part including the light distribution forming portion 50*a* in FIG. 7, and FIG. 9 is an enlarged view illustrating the part including the light distribution forming portion 50*a* in FIG. 4. As illustrated in FIGS. 8 and 9, the light distribution forming portion 50*a* according to the present embodiment mainly includes a first reflector 51, a pair of second reflectors 52*a* and 52*b*, a pair of upper side reflectors 53*a* and 53*b*, and a pair of lower side reflectors 54*a* and 54*b*.

The first reflector 51 is disposed between the first light source 41 and the second light source 42 and extends in a front-rear direction. The first reflector 51 has a tapered shape toward a front end 51*e* of the first reflector 51, and an upper surface and a lower surface of the first reflector 51 are reflective surfaces 51*ur* and 51*dr* that reflect light. In the present embodiment, the upper reflective surface 51*ur*, which is the upper surface, is positioned below the perpendicular line 41L for the first light source 41 and is concavely curved downward. The lower reflective surface 51*dr*, which is the lower surface, is positioned above the perpendicular line 42L for the second light source 42 and is concavely curved upward. The front end 51*e* of the first reflector 51 has a shape conforming to a cutoff line of the low beam light distribution pattern described below, and is gradually recessed rearward from left and right ends toward the center. As described above, the perpendicular line 41L for the first light source 41 and the perpendicular line 42L for the second light source 42 are directed toward the front side in the obliquely upward direction, and thus, the perpendicular line 41L extends away from the first reflector 51 as the perpendicular line 41L goes forward, and the perpendicular line 42L extends toward the first reflector 51 as the perpendicular line 42L goes forward.

One second reflector 52*a* is disposed above the first reflector 51, and has a reflective surface 52*ar* on a side facing the first reflector 51. The second reflector 52*a* according to the present embodiment is a plate-shaped member, and a side surface of the plate-shaped member is the reflective surface 52*ar*. The reflective surface 52*ar* and the upper reflective surface 51*ur* of the first reflector 51 extend in a parallel arrangement direction of the plurality of LEDs included in the first light source 41, and form a pair of reflectors disposed in such a way as to sandwich the plurality of LEDs from above and below.

The other second reflector 52*b* is disposed below the first reflector 51 and has a reflective surface 52*br* on a side facing the first reflector 51. The second reflector 52*b* according to the present embodiment is a plate-shaped member, and one main surface of the plate-shaped member is the reflective surface 52*br*. The reflective surface 52*br* and the lower reflective surface 51*dr* of the first reflector 51 extend in the parallel arrangement direction of the plurality of LEDs included in the second light source 42, and form a pair of reflectors disposed in such a way as to sandwich the plurality of LEDs from above and below.

One upper side reflector 53*a* is formed at one end of a space in the parallel arrangement direction of the plurality of LEDs included in the first light source 41, the space being sandwiched between the upper reflective surface 51*ur* of the first reflector 51 and the reflective surface 52*ar* of the one second reflector 52*a*. The other upper side reflector 53*b* is formed at the other end of the space. The pair of upper side reflectors 53*a* and 53*b* are formed in such a way that a distance therebetween increases from the rear toward the front. In the light distribution forming portion 50*a*, an opening 55 surrounded by the pair of upper side reflectors 53*a* and 53*b*, the first reflector 51, and the second reflector 52*a* is formed, and an emission surface 41*s* of the first light source 41 overlaps the opening 55 in front view. In FIG. 8, one first light source 41 and one emission surface 41*s* are denoted by reference numerals, and reference numerals for the others are omitted for the sake of clarity.

One lower side reflector 54 a is formed at one end of a space in the parallel arrangement direction of the plurality of LEDs included in the second light source 42, the space being sandwiched between the lower reflective surface 51*dr* of the first reflector 51 and the reflective surface 52*br* of the other second reflector 52*b*. The other lower side reflector 54*b* is formed at the other end of the space. The pair of lower side reflectors 54*a* and 54*b* are formed in such a way that a distance therebetween increases from the rear toward the front. In the light distribution forming portion 50*a*, an opening 56 surrounded by the pair of lower side reflectors 54*a* and 54*b*, the first reflector 51, and the second reflector 52*b* is formed, and an emission surface 42*s* of the second light source 42 overlaps the opening 56 in front view. In FIG. 8, one second light source 42 and one emission surface 42*s* are denoted by reference numerals, and reference numerals for the others are omitted for the sake of clarity. In addition, the opening 56 and the opening 55 penetrate from a flat facing surface 50*as* of the light distribution forming portion 50*a* facing the board 40 substantially in parallel, to a surface of the light distribution forming portion 50*a* on a side opposite to the board 40. The facing surface 50*as* does not have to be flat.

Through-holes 57 are provided on both left and right sides of the cover portion 50*b* according to the present embodiment, and the pins 27 of the heat sink 20 are inserted into the through-holes 57. Therefore, the reflector unit 50 can be positioned with respect to the heat sink 20 by a circumferential surface defining the through-hole 57 and the pin 27. As illustrated in FIG. 4, the integrated circuit 43 and the connector 44 overlap with the cover portion 50*b* in a direction perpendicular to the front surface 40*f* of the board 40. Therefore, when the board 40 is viewed in plan view, the cover portion 50*b* covers the integrated circuit 43 and the connector 44 mounted on the board 40. As illustrated in FIG.

3, a plurality of ribs 58 protruding rearward are provided on the light distribution forming portion 50*a* and the cover portion 50*b*. In a state in which the reflector unit 50 is fixed to the heat sink 20, distal ends of the ribs 58 are in contact with the front surface 40*f* of the board 40, and the board 40 is pressed against the heat sink 20 by the reflector unit 50 and is fixed to the heat sink 20.

In FIG. 6, parts 46*a*, 46*b*, 46*c*, and 46*d* where the reflector unit 50 presses the board 40 are indicated by hatching with oblique lines. In the present embodiment, the reflector unit 50 presses the four parts 46*a*, 46*b*, 46*c*, and 46*d*, the parts 46*a* and 46*b* are positioned at outer positions with respect to the bottom portion 45B of one recess 45, and the parts 46*c* and 46*d* are positioned at outer positions with respect to the bottom portion 45B of the other recess 45. Therefore, the reflector unit 50 presses parts of the board 40 that are positioned at outer positions with respect to the bottom portion 45B of each recess 45. In addition, the parts 46*a* and 46*b* are positioned above and below the one recess 45, and sandwich the one recess 45 in a direction along the side surface 40*sf*. In addition, the parts 46*c* and 46*d* are positioned above and below the other recess 45, and sandwich the other recess 45 in the direction along the side surface 40*sf*. Therefore, the reflector unit 50 presses both sides of each recess 45 in the board 40. In addition, outer shapes of the parts 46*a*, 46*b*, 46*c*, and 46*d* are substantially quadrangular, but are not particularly limited.

The projection lens 60 is a lens that changes a divergence angle of transmitted light, and is disposed in front of the reflector unit 50. In the present embodiment, the projection lens 60 is a biconvex aspherical lens having a substantially oval track shape whose outer shape is long in the left-right direction, and a flange portion 61 protruding outward and extending over the entire periphery is provided on an outer peripheral surface of the projection lens 60. An optical axis 60*c* of the projection lens 60 extends in the front-rear direction, intersects with the first reflector 51, and passes between the first light source 41 and the second light source 42. A focal point 60*f* behind the projection lens 60 is positioned in the vicinity of the front end 51*e* between the front end 51*e* of the first reflector 51 and the projection lens 60, and the vicinity of the front end 51*e* is, for example, a position where a distance to the front end 51*e* is 10 mm or less. The focal point 60*f* may be positioned at the front end 51*e* or may overlap the first reflector 51. Examples of a material of the projection lens 60 include a resin and glass.

As illustrated in FIGS. 1 to 3, the holder 70 according to the present embodiment includes a cylindrical support portion 71 extending in the front-rear direction, and a pair of foot portions 72 extending rearward from both left and right sides of a rear end of the support portion 71. A plurality of pedestals 73 protruding forward are provided on a front end of the support portion 71, and the flange portion 61 of the projection lens 60 is fixed to the pedestals 73 by ultrasonic welding or laser welding, for example. The foot portion 72 is fixed to the heat sink 20 by a screw 81, and the projection lens 60 is fixed to the heat sink 20 via the holder 70. Examples of a material of the holder 70 include a resin such as opaque polycarbonate, and in the present embodiment, the support portion 71 and the foot portions 72 are integrally formed.

Next, the rear surface side of the heat sink 20 will be described.

Figure 10:
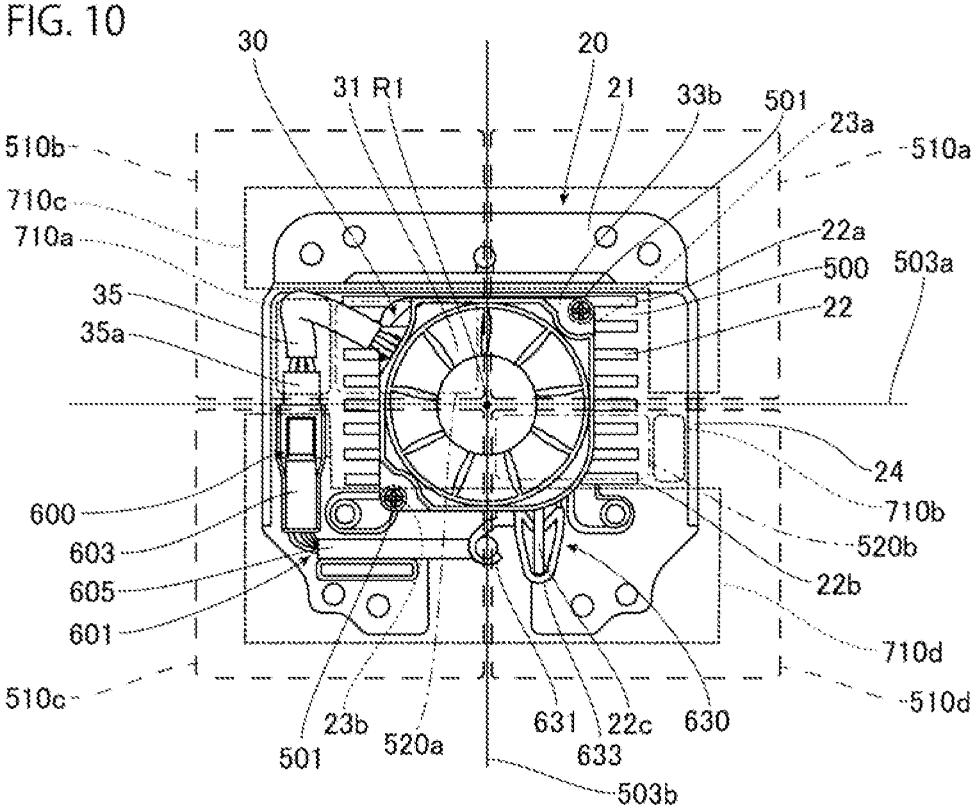
FIG. 10 is a rear view of the heat sink.

FIG. 10 is a rear view of the heat sink 20. The plurality of heat dissipation fins 22 of the heat sink 20 are arranged in parallel at intervals and extend in the left-right direction. In each drawing, only one heat dissipation fin 22 and one gap 500 between adjacent heat dissipation fins 22 are denoted by reference numerals for the sake of visibility. In FIG. 10, among the plurality of heat dissipation fins 22, the uppermost heat dissipation fin is referred to as a heat dissipation fin 22*a*, and the lowermost heat dissipation fin is referred to as a heat dissipation fin 22*b*. Unless otherwise specified, the heat dissipation fins 22 refer to the heat dissipation fins 22*a* and 22*b* and heat dissipation fins positioned between the heat dissipation fins 22*a* and 22*b* and extending in the left-right direction.

Left and right sides of the heat dissipation fins 22 and an upper side of the heat dissipation fin 22*a* are surrounded by the peripheral wall portion 24. The peripheral wall portion 24 is a frame body surrounding the heat dissipation fins 22 as described above, and is separated from the heat dissipation fins 22. In the front-rear direction, left and right walls of the peripheral wall portion 24 are shorter than the heat dissipation fins 22, and an upper wall of the peripheral wall portion 24 is longer than the heat dissipation fins 22.

As illustrated in FIGS. 2, 3, and 10, the fan 30 is provided behind the plurality of heat dissipation fins 22. The fan 30 mainly includes an impeller 31 provided on a side opposite to the base plate 21 with respect to the plurality of heat dissipation fins 22, and a support unit 33. The impeller 31 is not illustrated in FIGS. 2 and 3 for the sake of visibility. FIG. 10 is also a view when viewed along a rotation axis R1 of the impeller 31. Each of the impeller 31 and the support unit 33 is made of a resin, for example.

The impeller 31 rotates about the rotation axis R1 in a direction perpendicular to the rear surface of the base plate 21. The impeller 31 rotates along the rear surface of the base plate 21 to send air to the gap 500 between adjacent heat dissipation fins 22. The impeller 31 according to the present embodiment rotates counterclockwise. The impeller 31 is rotatably supported by the support unit 33.

The support unit 33 mainly includes a base member 33*a* on which the impeller 31 is disposed, and a support member 33*b* provided on sides of the impeller 31 and the base member 33*a* when the fan 30 is viewed from the rear.

The base member 33*a* is a circular plate-shaped member and is disposed in front of the impeller 31. The base member 33*a* is not illustrated in FIG. 10 for the sake of visibility. The base member 33*a* is coupled to the support member 33*b* via spokes 33*c* coupled to an outer peripheral surface of the base member 33*a* and an inner peripheral surface of the support member 33*b*. Therefore, the support member 33*b* rotatably supports the impeller 31 via the base member 33*a* and the spokes 33*c*. The spokes 33*c* are not illustrated in FIG. 10 for the sake of visibility.

The support member 33*b* is an outer frame surrounding the sides of the impeller 31 and the base member 33*a*, and is formed in a substantially square shape. In the support member 33*b* according to the present embodiment, two substantially parallel sides of the substantially square support member 33*b* extend in the left-right direction. The support member 33*b* is shorter than the heat dissipation fins 22 in the left-right direction, and is longer than an interval between the heat dissipation fins 22*a* and 22*b* in the vertical direction. Front surfaces of the base member 33*a* and the support member 33*b* are in contact with rear ends of the heat dissipation fins 22, but may also be separated from the rear ends. Four corners of the support member 33*b* are rounded.

Through-holes 33*d* are provided at an upper-right corner and a lower-left corner among the four corners of the support member 33*b*, screws 501 are inserted into the through-holes 33*d*, and the screws 501 are screwed into the attachment bosses 23*a* and 23*b*. As a result, the fan 30 is attached to the heat sink 20 via the support member 33*b* and the attachment bosses 23*a* and 23*b*.

Next, positions of the attachment bosses 23*a* and 23*b* will be described with reference to FIG. 10. In FIG. 10, the attachment bosses 23*a* and 23*b* are not visible because of being hidden by the fan 30, but are illustrated by broken lines for easy understanding.

In FIG. 10, a straight line that passes through the rotation axis R1 and extends in an extending direction of the heat dissipation fin 22 is indicated as a first reference line 503*a*, and a straight line that passes through the rotation axis R1 and extends in a direction orthogonal to the first reference line 503*a* is indicated as a second reference line 503*b*. Four regions are formed by the reference lines 503*a* and 503*b*, and the upper-right, upper-left, lower-left, and lower-right regions with respect to the rotation axis R1 are indicated as regions 510*a*, 510*b*, 510*c*, and 510*d*, respectively. Each region is illustrated slightly offset from the reference lines 503*a* and 503*b* for the sake of visibility. When the fan 30 is viewed from the rear, among the four regions 510*a*, 510*b*, 510*c*, and 510*d*, the regions 510*a* and 510*b* and the regions 510*c* and 510*d* are regions adjacent to each other in the extending direction of the heat dissipation fin 22. Since the impeller 31 rotates counterclockwise, the region 510*a* of the regions 510*a* and 510*b* and the region 510*c* of the regions 510*c* and 510*d* are rear side regions in a rotation direction of the impeller 31. In the heat sink 20, the attachment boss 23*a* is provided in the rear side region 510*a*, and the attachment boss 23*b* is provided in the rear side region 510*c*. Therefore, the attachment bosses 23*a* and 23*b* are provided in the rear side regions 510*a* and 510*c*, respectively. It is sufficient if at least a part of the attachment boss 23*a* is provided in the rear side region 510*a*, and at least a part of the attachment boss 23*b* is provided in the rear side region 510*c*.

As described above, the support member 33*b* is attached to the attachment bosses 23*a* and 23*b*. Therefore, when the fan 30 is viewed from the rear, the attachment bosses 23*a* and 23*b* are positioned on the side of the impeller 31. In addition, since the through-holes 33*d* are provided at the upper-right and lower-left corners of the support member 33*b*, an example is illustrated in which the attachment boss 23*a* overlaps the upper-right corner and the attachment boss 23*b* overlaps the lower-left corner. The attachment boss 23*a* is positioned between the first reference line 503*a* and the heat dissipation fin 22*a* that is most distant from the first reference line 503*a* in the upward direction, specifically, in the gap 500 between the heat dissipation fin 22*a* and the heat dissipation fin 22 adjacent to the heat dissipation fin 22*a*. The attachment boss 23*b* is positioned on an outer side of the heat dissipation fin 22*b*, the outer side being a side opposite to the gap 500. The attachment bosses 23*a* and 23*b* positioned as described above do not overlap each other in the extending direction of the heat dissipation fin 22. The attachment boss 23*a* is coupled to the heat dissipation fin 22*a* and the heat dissipation fin 22 adjacent to the heat dissipation fin 22*a*, and the attachment boss 23*b* is coupled to the heat dissipation fin 22*b*. The attachment bosses 23*a* and 23*b* may be coupled to at least one of the heat dissipation fins 22 that are adjacent to each other and form the gap 500, or may be separated from the heat dissipation fins 22.

In FIG. 10, a region between the first reference line 503*a* and the heat dissipation fin 22*a* that is most distant from the first reference line 503*a* in the upward direction is indicated as a predetermined region 520*a*, the region overlapping the region 510*b* that is a front side region in the rotation direction of the impeller 31 among the regions 510*a* and 510*b* adjacent to each other in the extending direction of the heat dissipation fin 22. Some LEDs of the first light source 41 overlap the predetermined region 520*a* when the fan 30 is viewed from the rear. At least one LED of the first light source 41 may overlap at least a part of the predetermined region 520*a*. Most of air flowing through the gap 500 flows toward an end side of the gap 500 that overlaps the region 510*b* due to an influence of a vortex of the air flow caused by the rotation of the impeller 31. Therefore, the predetermined region 520*a* is more easily cooled as compared with a region outside the predetermined region 520*a*, and heat generated in the first light source 41 overlapping the predetermined region 520*a* is easily transferred to the heat dissipation fin 22. Although the predetermined region 520*a* has been described above, the heat generated in the first light source 41 is easily transferred to the heat dissipation fins 22 even in a case where the first light source 41 overlaps a predetermined region 520*b* as described above. The predetermined region 520*b* is a region between the first reference line 503*a* and the heat dissipation fin 22*b* that is most distant from the first reference line 503*a* in a downward direction, the region overlapping the region 510*d* that is a front side region in the rotation direction of the impeller 31 among the regions 510*c* and 510*d* adjacent to each other in the extending direction of the heat dissipation fin 22. The first light source 41 may overlap both of the predetermined regions 520*a* and 520*b*. Although the first light source 41 has been described above, the second light source 42 may overlap the predetermined regions 520*a* and 520*b* in the same manner as the first light source 41.

Meanwhile, a structure 600 other than the heat sink 20 and the fan 30 is disposed on the rear surface side of the base plate 21. The structure 600 includes a conductive member 601 that supplies power to the fan 30, and the conductive member 601 includes a power supply side wiring 605 including a connector 603.

A fan side connector 35*a* of a fan side wiring 35 extending from the fan 30 is connected to the connector 603. The connector 603 is fixed to the rear surface of the base plate 21 between the left wall of the peripheral wall portion 24 and the heat dissipation fins 22.

A part of the power supply side wiring 605 is supported by a clamp 630. The clamp 630 includes a holding portion 631 and a hooking portion 633. The holding portion 631 has a substantially concave shape when the fan 30 is viewed from the rear, and is coupled to the hooking portion 633. The hooking portion 633 hooks a receiving member 22*c* by pinching left and right surfaces of the receiving member 22*c* positioned in the region 510*d*. The receiving member 22*c* is a plate-shaped member and is provided on the rear surface of the base plate 21. The receiving member 22*c* is coupled to a surface of the heat dissipation fin 22*b* on a side opposite to the gap 500. The receiving member 22*c* may dissipate heat as a heat dissipation fin. The power supply side wiring 605 passes through the holding portion 631 in the front-rear direction and is hooked by the holding portion 631, whereby the holding portion 631 holds the power supply side wiring 605. The power supply side wiring 605 further extends rearward from the holding portion 631 and is connected to the power supply unit (not illustrated). When the power supply unit supplies power to the fan 30 via the power supply side wiring 605 and the fan side wiring 35, the fan 30 rotates.

Next, a position of the structure 600 will be described. When the fan 30 is viewed from the rear, the structure 600 is positioned in regions 710*c* and 710*d* other than regions 710*a* and 710*b* on a leeward side of air that has passed through the gap 500 in the extending direction of the heat dissipation fin 22. In FIG. 10, the regions 710*a*, 710*b*, 710*c*, and 710*d* are slightly shifted from the other regions described above for the sake of visibility. The regions 710*a*, 710*b*, 710*c*, and 710*d* will be described below.

The region 710*a* is a region on a left side of the gap 500 between adjacent heat dissipation fins 22 provided above the first reference line 503*a* in the region 510*b*, and on a left side of the heat dissipation fins 22. The region 710*b* according to the present embodiment is a region on a right side of the gap 500 between the adjacent heat dissipation fins 22 provided below the first reference line 503*a* in the region 510*d*, and on a right side of the heat dissipation fins 22.

The regions 710*c* and 710*d* are regions excluding the regions 710*a* and 710*b* outside a region surrounded by the heat dissipation fins 22*a* and 22*b* on the rear surface side of the base plate 21. The region 710*c* is a region provided above a straight line parallel to the first reference line 503*a* and passing through the heat dissipation fin 22*a* and above the region 710*b*. The region 710*d* is a region provided below a straight line parallel to first reference line 503*a* and passing through the heat dissipation fin 22*b* and below the region 710*a*.

FIG. 10 illustrates an example in which the conductive member 601 and the clamp 630 are disposed in the region 710*d*. The conductive member 601 and the clamp 630 are not disposed in the regions 710*a* and 710*b* and are provided at positions not overlapping with outlets for air flowing along the heat dissipation fins 22. The conductive member 601 and the clamp 630 may be provided in the region 710*c*. The conductive member 601 and the clamp 630 are positioned at positions lower than the rear ends of the heat dissipation fins 22 in the front-rear direction. The conductive member 601 is disposed away from the heat dissipation fins 22.

Next, a flow of air along the heat dissipation fins 22 accompanying the driving of the fan 30 will be described.

When the impeller 31 sends air to the gap 500 between adjacent heat dissipation fins 22, the air hits the rear surface of the base plate 21 and flows through the gap 500 along the heat dissipation fins 22. The air flowing through the gap 500 easily flows toward the end side of the gap 500 due to the influence of the vortex of the air flow caused by the rotation of the impeller 31. This end overlaps the front side regions 510*b* and 510*d*.

The attachment bosses 23*a* and 23*b* are positioned on the side of the impeller 31 in the rear side regions 510*a* and 510*c* in the rotation direction of the impeller 31. In the gap 500 where the attachment boss 23*a* is positioned, air flows to a side opposite to the attachment boss 23*a*. Therefore, the attachment boss 23*a* is provided in a portion other than a traveling path of the air flowing through the gap 500, and is provided at a position where the attachment boss 23*a* does not block the air. As a result, the blocking of the air by the attachment boss 23*a* is suppressed, and the air flowing through the gap 500 where the attachment boss 23*a* is positioned is blown to the left side of the heat dissipation fins 22 through the gap 500. Air flows to a side opposite to the attachment boss 23*b* on the outer side of the heat dissipation fin 22*b*. Accordingly, blocking of the air by the attachment boss 23*b* is also suppressed.

When the fan 30 is viewed from the rear, in the gap 500 other than the gap 500 where the attachment boss 23*a* is positioned, the air is easily blown to the left side of the heat dissipation fins 22 in the gap 500 above the first reference line 503*a*. In the gap 500 below the first reference line 503*a*, the air is easily blown to the right side of the heat dissipation fins 22.

The conductive member 601 and the clamp 630 are positioned in the region 710*d* other than the regions 710*a* and 710*b* on the leeward side of the air passing through the gap 500 in the extending direction of the heat dissipation fin 22. Therefore, the conductive member 601 and the clamp 630 are provided in a portion other than the traveling path of the air passing through the gap 500, and are provided at positions where the conductive member 601 and the clamp 630 do not block the air. As a result, the air is blown to the side of the heat dissipation fins 22 in a state in which the blocking of the air by the conductive member 601 and the clamp 630 is suppressed.

Figure 11:
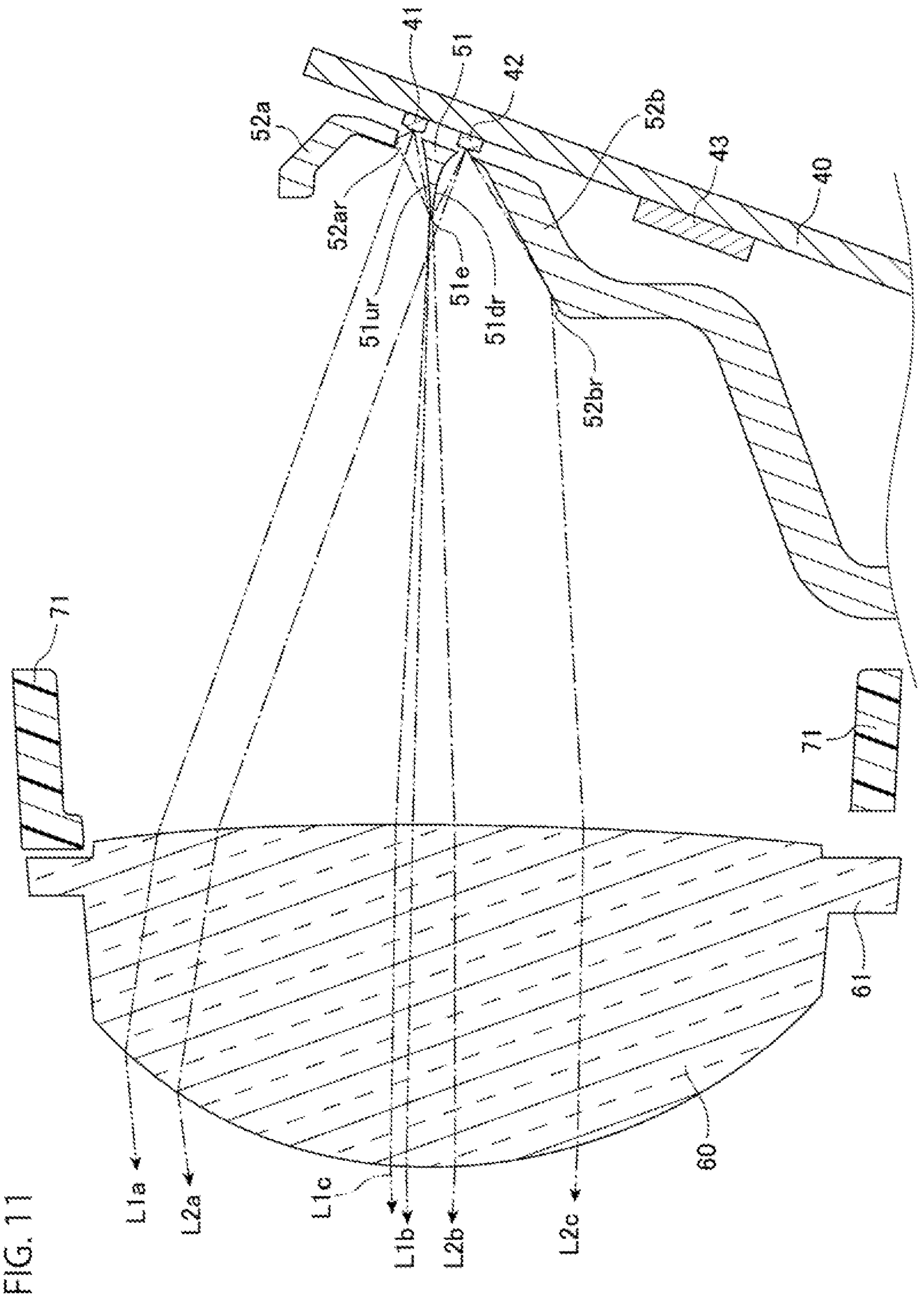
FIG. 11 is an enlarged view of a part of FIG. 4, schematically illustrating an optical path example of light emitted from a first light source and light emitted from a second light source.

Next, formation of the low beam light distribution pattern by the vehicular headlamp 1 will be described. FIG. 11 is an enlarged view of a part of FIG. 4, schematically illustrating an optical path example of light emitted from the first light source 41 and light emitted from the second light source 42. A reflection angle, a refraction angle, and the like of light illustrated in FIG. 11 may not be accurate.

In the case of forming the low beam light distribution pattern, light is emitted from the first light source 41. Partial light L1*a* of the light emitted from the first light source 41 is directly incident on the projection lens 60 through between the upper reflective surface 51*ur* of the first reflector 51 and the one second reflector 52*a*. Another partial light L1*b* of the light emitted from the first light source 41 is reflected toward the projection lens 60 at a part including a front end portion of the upper reflective surface 51*ur* of the first reflector 51, and is incident on the projection lens 60. Still another partial light L1*c* of the light emitted from the first light source 41 is reflected by the reflective surface 52*ar* of the one second reflector 52*a*, reflected toward the projection lens 60 at a part including the front end portion of the upper reflective surface 51*ur* of the first reflector 51, and incident on the projection lens 60. Since the front end 51*e* of the first reflector 51 has a shape conforming to the cutoff line as described above, the cutoff line in the low beam light distribution pattern is formed by light passing the vicinity of the front end 51*e* of the first reflector 51 among the rays of light emitted from the first light source 41. Although not illustrated, partial light diffused in the left-right direction among the rays of light emitted from the first light source 41 is reflected by the pair of upper side reflectors 53*a* and 53*b* and is incident on the projection lens 60. In this manner, the low beam light distribution pattern is formed by the light emitted from the first light source 41 and directly incident on the projection lens 60 and the light emitted from the first light source 41, reflected by the reflector unit 50, and incident on the projection lens 60. Light having the low beam light distribution pattern is transmitted through the projection lens 60 and emitted from the vehicular headlamp 1 via the front cover 12. As described above, the focal point 60*f* behind the projection lens 60 is positioned near the front end 51*e*, the low beam light distribution pattern projected in front of the vehicle is a light distribution pattern inverted by the projection lens 60.

In the present embodiment, the light L1*a* directly incident on the projection lens 60 is light emitted mainly in a direction parallel to the perpendicular line 41L. The light L1*b* reflected by the first reflector 51 and incident on the projection lens 60 and the light L1*c* reflected by the second reflector 52*a*, reflected by the first reflector 51, and incident on the projection lens 60 are mainly light emitted in a direction non-parallel to the perpendicular line 41L. However, the light L1*a* may include light emitted in a direction non-parallel to the perpendicular line 41L, and the light L1*c* may include light emitted in a direction parallel to the perpendicular line 41L.

Figure 12:
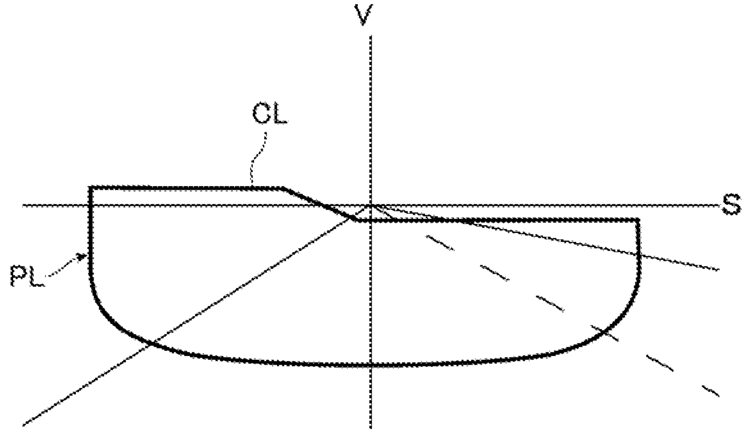
FIG. 12 is a view illustrating a low beam light distribution pattern in the first embodiment.

FIG. 12 is a view illustrating the low beam light distribution pattern in the present embodiment. In FIG. 12, S indicates a horizontal line, V indicates a vertical line passing through the center of the vehicle in the left-right direction, and a low beam light distribution pattern PL projected on a virtual vertical screen arranged 25 m ahead of the vehicle is indicated by a thick line. The reflector unit 50 has such a shape that a light distribution pattern of light incident on the projection lens 60 from the first light source 41 becomes such a low beam light distribution pattern PL. A cutoff line CL of the low beam light distribution pattern PL corresponds to the shape of the front end 51*e* of the first reflector 51, and has a step in the present embodiment.

Next, formation of the high beam light distribution pattern by the vehicular headlamp 1 will be described.

In the case of forming the high beam light distribution pattern, light is emitted from the first light source and light is emitted from the second light source 42. Therefore, as described above, the low beam light distribution pattern PL is formed by the light from the first light source 41, and the light having the low beam light distribution pattern PL is emitted from the vehicular headlamp 1. Partial light L2*a* of the light emitted from the second light source 42 is directly incident on the projection lens 60 through between the lower reflective surface 51*dr* of the first reflector 51 and the other second reflector 52*b*. Another partial light L2*b* of the light emitted from the second light source 42 is reflected toward the projection lens 60 at a part including a front end portion of the lower reflective surface 51*dr* of the first reflector 51, and is incident on the projection lens 60. Still another partial light L2*c* of the light emitted from the second light source 42 is reflected toward the projection lens 60 by the reflective surface 52*br* of the other second reflector 52*b* and is incident on the projection lens 60. Light passing the vicinity of the front end 51*e* of the first reflector 51 among the rays of light emitted from the second light source 42 forms the cutoff line corresponding to the front end 51*e* in the light distribution pattern formed by the light emitted from the second light source 42. Although not illustrated, partial light diffused in the left-right direction among the rays of light emitted from the second light source 42 is reflected by the pair of lower side reflectors 54*a* and 54*b* and is incident on the projection lens 60. In this manner, an additional beam light distribution pattern is formed by the light emitted from the second light source 42 and directly incident on the projection lens 60 and the light emitted from the second light source 42, reflected by the reflector unit 50, and incident on the projection lens 60. The additional light distribution pattern is a light distribution pattern added to the low beam light distribution pattern PL to form the high beam light distribution pattern, and the light emitted from the second light source 42 forming the additional light distribution pattern forms the high beam light distribution pattern with the light emitted from the first light source 41. In this way, the additional light distribution pattern is formed by the light from the second light source 42, and light having the additional light distribution pattern is transmitted through the projection lens 60 and emitted from the vehicular headlamp 1 via the front cover 12. Therefore, light having the high beam light distribution pattern is emitted from the vehicular headlamp 1. The additional light distribution pattern projected forward from the vehicle is a light distribution pattern inverted by the projection lens 60 similarly to the low beam light distribution pattern PL. The cutoff line of the additional light distribution pattern is defined by the front end 51*e* of the first reflector 51 similarly to the cutoff line CL of the low beam light distribution pattern PL. Therefore, the cutoff line of the additional light distribution pattern and the cutoff line CL of the low beam light distribution pattern PL substantially coincide with each other, and in the high beam light distribution pattern, the additional light distribution pattern and the low beam light distribution pattern PL are connected.

In the present embodiment, an upper side of the low beam light distribution pattern PL and a lower side of the additional light distribution pattern overlap each other, but the low beam light distribution pattern PL and the additional light distribution pattern do not have to overlap each other. In this case, at least a part of the cutoff line of the additional light distribution pattern coincides with at least a part of the cutoff line CL of the low beam light distribution pattern PL, and the additional light distribution pattern and the low beam light distribution pattern PL are connected. In addition, in the present embodiment, the light L2*a* directly incident on the projection lens 60 is light emitted mainly in a direction parallel to the perpendicular line 42L. The light L2*b* reflected by the first reflector 51 and incident on the projection lens 60 and the light L2*c* reflected by the second reflector 52*a* and incident on the projection lens 60 are mainly light emitted in a direction non-parallel to the perpendicular line 42L. However, the light L2*a* may include light emitted in a direction non-parallel to the perpendicular line 42L, and the light L2*b* may include light emitted in a direction parallel to the perpendicular line 42L. In addition, in the present embodiment, since the power supplied to each LED of the second light source 42 can be individually adjusted by the integrated circuit 43, the additional light distribution pattern can be changed, and the high beam light distribution pattern can be changed.

Figure 13:
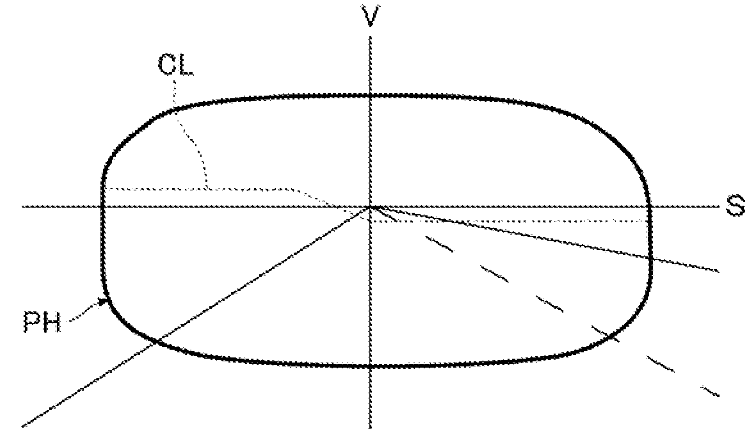
FIG. 13 is a view illustrating a high beam light distribution pattern in the first embodiment.

FIG. 13 is a view illustrating the high beam light distribution pattern in the present embodiment, and is a view illustrating the high beam light distribution pattern similarly to FIG. 12. A high beam light distribution pattern PH illustrated in FIG. 13 is for a case where light is emitted from all the LEDs included in the second light source 42. In FIG. 13, the cutoff line CL in the low beam light distribution pattern PL is indicated by a dotted line. A region below the cutoff line CL in the high beam light distribution pattern PH is mainly formed by the light from the first light source, and a region above the cutoff line CL is mainly formed by the light from the second light source 42.

By the way, in a case where the reflector unit presses the board against the heat sink as in the lamp fitting of Patent Literature 1 described above, there is a possibility that the board is distorted by a pressing force of the reflector unit, a direction of the light source is changed, and a a light distribution pattern different from predetermined light distribution pattern is formed.

Therefore, in the vehicular headlamp 1 according to the present embodiment as the first aspect, the board 40 on which the first light source 41 and the second light source 42 are mounted has the recesses 45 which are recessed portions of the side surfaces 40*sf* facing each other. The reflector unit 50 presses parts of the board 40 that are positioned at outer positions with respect to the bottom portion 45B of each recess 45. Therefore, a strength of the parts of the board 40 that are positioned at the outer positions with respect to the bottom portion 45B of each recess 45 is weakened as compared with a case where the board 40 does not have the recesses 45, and the reflector unit 50 presses the parts having the weakened strength as described above. Therefore, with the vehicular headlamp 1 according to the present embodiment as the first aspect, it is possible to concentrate distortion of the board 40 due to the pressing force of the reflector unit 50 on the parts having the weakened strength, and it is thus possible to reduce distortion of an inner portion with respect to the bottom portion 45B of the recess portion 45 as compared with the above case. In addition, in the vehicular headlamp 1 according to the present embodiment as the first aspect, the first light source 41 and the second light source 42 are positioned at inner positions with respect to the bottom portion 45B of the recess portion 45. Therefore, with the vehicular headlamp 1 according to the present embodiment as the first aspect, it is possible to suppress a change in directions of the first light source 41 and the second light source 42 due to the distortion of the board 40, and it is thus possible to more easily form the low beam light distribution pattern or the high beam light distribution pattern as compared with the above case. In the vehicular headlamp 1 according to the present embodiment as the first aspect, the reflector unit 50 presses one recess 45 side and the other recess 45 side of the board 40. Therefore, with the vehicular headlamp 1 according to the present embodiment as the first aspect, it is possible to suppress misalignment in a relative position between the board 40 and the heat sink 20, and it is thus possible to more easily form the low beam light distribution pattern or the high beam light distribution pattern as compared with a case where the reflector unit 50 presses only one recess side of the board 40.

In addition, in the vehicular headlamp 1 according to the present embodiment as the first aspect, the reflector unit 50 presses both sides of each recess 45 in the board 40. Therefore, with the vehicular headlamp 1 according to the present embodiment as the first aspect, it is possible to suppress misalignment in the relative position between the board 40 and the heat sink 20 as compared with a case where the reflector unit 50 presses only one side of each recess 45 in the board 40.

In addition, in the vehicular headlamp 1 according to the present embodiment as the first aspect, the reflector unit 50 has the flat facing surface 50*as* facing the board 40, and the openings 55 and 56 penetrating from the facing surface 50*as* to the surface on the side opposite to the board 40. The first light source 41 overlaps the opening 55, and the opening 56 overlaps the second light source 42. Therefore, with the vehicular headlamp 1 according to the present embodiment as the first aspect, for example, the facing surface 50*as* can be more easily formed by cutting as compared with a case where the facing surface 50*as* is not flat.

In addition, in the vehicular headlamp 1 according to the present embodiment as the first aspect, the integrated circuit 43 that adjusts the power supplied to at least one of the first light source 41 or the second light source 42 and the connector 44 are mounted on the board 40, and the integrated circuit 43 and the connector 44 are covered by the reflector unit 50. Therefore, with the vehicular headlamp 1 according to the present embodiment as the first aspect, it is possible to suppress the integrated circuit 43 from being irradiated with sunlight or the like incident from the outside via the projection lens 60.

Meanwhile, a bright part in the low beam light distribution pattern and the high beam light distribution pattern greatly affects visibility. In general, the vicinity of the cutoff line of the low beam light distribution pattern is bright, and the vicinity of the center of the high beam light distribution pattern is bright. In the vehicular headlamp of Patent Literature 1 described above, emission surfaces of the first light source and the second light source are planar, the first light source and the second light source are mounted on different boards, and a perpendicular line for the emission surface of each of the first light source and the second light source extends toward the first reflector as the perpendicular line goes forward. A light flux of light emitted from a light source having a planar emission surface tends to increase as approaching a perpendicular line for the emission surface. Therefore, in the vehicular headlamp of Patent Literature 1, it is considered that a front end portion of the upper surface of the first reflector can be brightened by the light from the first light source, and the vicinity of the cutoff line of the low beam light distribution pattern can be brightened. In addition, it is considered that a front end portion of the lower surface of the first reflector can be brightened by the light from the second light source, a lower beam light distribution pattern of the side additional light distribution pattern can be brightened, and the vicinity of the center of the high beam light distribution pattern can be brightened. However, in the vehicular headlamp of Patent Literature 1, the first light source and the second light source are mounted on different boards, and thus, the number of components tends to increase.

Therefore, in the vehicular headlamp 1 according to the present embodiment as the second aspect, the first light source 41 and the second light source 42 are mounted on the common board 40, and thus, the number of components can be reduced as compared with a case where the first light source 41 and the second light source 42 are mounted on different boards.

In addition, in the vehicular headlamp 1 according to the present embodiment as the second aspect, the perpendicular line 41L for the emission surface 41*s* of the first light source 41 extends away from the first reflector 51 as the perpendicular line 41L goes forward, unlike the perpendicular lines for the emission surfaces of the first light source and the second light source of Patent Literature 1 described above. Therefore, a light flux of the light L1*b* emitted from the first light source 41 and directly incident on the front end portion of one reflective surface 51*ur* of the first reflector 51 tends to decrease, and it is difficult to brighten the front end portion. However, not only the light L1*b* but also the light L1*c* emitted from the first light source 41 and reflected by the second reflector 52*a* is incident on the front end portion of the reflective surface 51*ur* of the first reflector 51, and the light L1*b* and the light L1*c* are reflected toward the projection lens 60. Therefore, even with such a first light source 41, it is possible to prevent the front end portion of the reflective surface 51*ur*, which is the upper surface of the first reflector 51, from becoming dark. Further, the perpendicular line 42L for the emission surface 42*s* of the second light source 42 extends toward the first reflector 51 as the perpendicular line 42L goes forward, similarly to the perpendicular lines for the emission surfaces of the first light source and the second light source of Patent Literature 1 described above. Therefore, the light from the second light source 42 can brighten the front end portion of the reflective surface 51*dr* which is the lower surface of the first reflector 51. Therefore, the vehicular headlamp 1 according to the present embodiment as the second aspect can suppress the front end portions of the upper surface and the lower surface of the first reflector 51 from becoming dark. Accordingly, with the vehicular headlamp 1 according to the present embodiment, it is possible to suppress the vicinity of the cutoff line CL of the low beam light distribution pattern PL and the vicinity of the center of the high beam light distribution pattern PH from becoming dark, and it is possible to suppress deterioration in visibility.

In the vehicular headlamp 1 according to the present embodiment as the second aspect, the still another partial light L1*c* of the light emitted from the first light source 41 is reflected by the one second reflector 52*a* toward the first reflector 51 with a divergence angle smaller than that when the still another partial light L1*c* is incident. Therefore, with the vehicular headlamp 1 according to the present embodiment as the second aspect, it is possible to further suppress the vicinity of the cutoff line CL of the low beam light distribution pattern PL from becoming dark. In the present embodiment, the reflective surface 52*ar* of the second reflector 52*a* that reflects the light L1*c* is a part of a spheroidal surface, and one focal point of the spheroidal surface is positioned at the front end portion of the reflective surface 51*ur* of the first reflector 51, and the other focal point is positioned at an intersection of the emission surface 41*s* of the first light source 41 and the perpendicular line 41L. However, a shape of the reflective surface 52*ar* is not particularly limited. The still another partial light L1*c* may be reflected by the one second reflector 52*a* toward the first reflector 51 with a divergence angle made equal to or larger than that when the still another partial light L1*c* is incident.

In addition, in the vehicular headlamp 1 according to the present embodiment as the second aspect, the still another partial light L2*c* of the light emitted from the second light source 42 is reflected by the other second reflector 52*b* toward the projection lens 60 with a divergence angle larger than that when the still another partial light L2*c* is incident. Therefore, with the vehicular headlamp 1 according to the present embodiment as the second aspect, the high beam light distribution pattern PH can be easily expanded upward. The still another partial light L2*c* may be reflected by the other second reflector 52*b* toward the projection lens 60 with a divergence angle equal to or smaller than that when the still another partial light L2*c* is incident.

The vehicular headlamp 1 according to the present embodiment as the second aspect further includes the integrated circuit 43 that is mounted on the board 40 and adjusts power supplied to at least one of the first light source 41 and the second light source 42. The reflector unit 50 includes the cover portion 50*b* that covers the integrated circuit 43. Therefore, with the vehicular headlamp 1 according to the present embodiment, it is possible to suppress the integrated circuit 43 from being irradiated with sunlight or the like incident from the outside via the projection lens 60.

Although the first aspect of the present invention has been described by taking the first embodiment as an example, the first aspect of the present invention is not limited thereto.

For example, in the first embodiment, the heat sink 20 having the protrusion 26 inserted into each recess 45 has been described as an example. However, as the first aspect, the heat sink 20 does not have to have the protrusion 26.

In the first embodiment, the reflector unit 50 that presses both sides of each recess 45 in the board 40 has been described as an example. However, as the first aspect, the reflector unit 50 may press parts of the board 40 that are positioned at outer positions with respect to the bottom portion 45B which is a distal end in a recessed direction of each recess 45. The reflector unit 50 may press one side of each recess 45 in the board 40, and for example, may press only the parts 46*a* and 46*c* illustrated in FIG. 6 or may press only the parts 46*b* and 46*d*. Further, the reflector unit 50 may further press a part positioned at an inner position with respect to each recess 45 in the board 40.

In the first embodiment, the board 40 having one recess 45 on each of the left and right sides of the board 40 has been described as an example. However, as the first aspect, it is sufficient if the board 40 has the recesses 45 which are recessed portions of the left and right side surfaces facing each other. For example, a plurality of recesses 45 may be provided on one side and the other side of the board 40, and the number of recesses 45 on one side and the number of recesses 45 on the other side may be different. In the first embodiment, the board 40 on which the first light source 41 and the second light source, which are LED arrays, are mounted has been described as an example. However, as the first aspect, the light source mounted on the board 40 is not particularly limited.

In the first embodiment, the reflector unit 50 covering the connector 44 mounted on the board 40 has been described as an example. However, as the first aspect, the reflector unit 50 does not have to cover the connector 44 as illustrated in FIG. 14.

Figure 14:
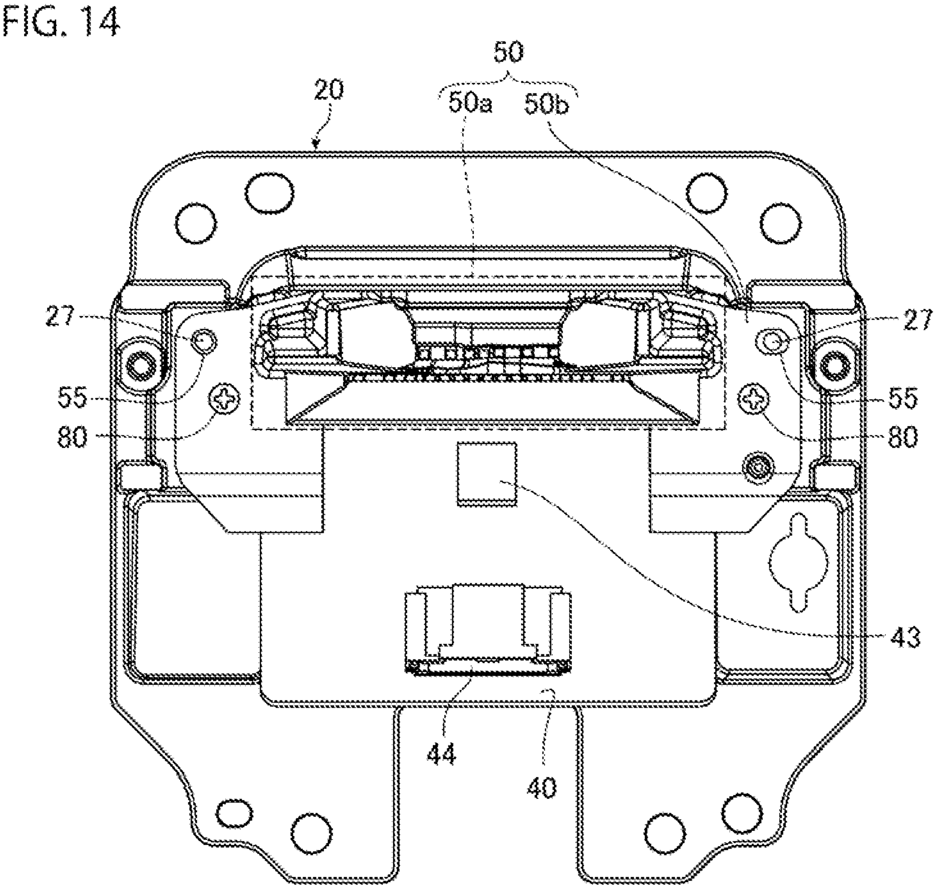
FIG. 14 is a view illustrating a state in which a reflector unit according to a first modification as the first aspect is attached to a heat sink similarly to FIG. 7.
Figure 15:
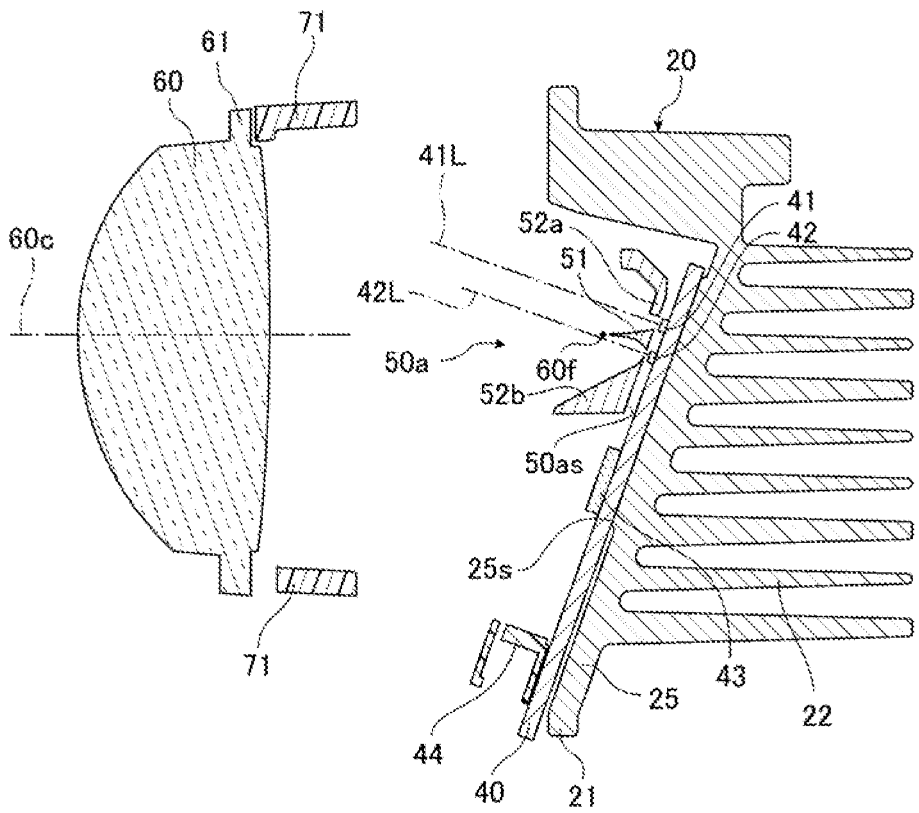
FIG. 15 is a view illustrating a lamp fitting unit according to the first modification similarly to FIG. 4.

FIG. 14 is a view illustrating a state in which a reflector unit 50 according to a first modification as the first aspect is attached to a heat sink 20 similarly to FIG. 7, and FIG. 15 is a view illustrating a lamp fitting unit LU according to the first modification similarly to FIG. 4. The same or equivalent constituent elements as those of the above embodiment are denoted by the same reference numerals, and an overlapping description will be omitted unless otherwise specified.

As illustrated in FIGS. 14 and 15, in the reflector unit 50 according to the present modification, a shape of a cover portion 50*b* is different from the shape of the cover portion 50*b* according to the first embodiment. The cover portion 50*b* of the reflector unit 50 according to the present modification is not formed on a lower side, which is a side opposite to a first light source 41 and a second light source 42 with respect to a connector 44 in a direction along a front surface 40*f* of a board 40. Therefore, it is possible to more easily connect another connector to the connector 44 as compared with a case where the reflector unit 50 is formed on the side opposite to the first light source 41 and the second light source 42 with respect to the connector 44. In addition, since the cover portion 50*b* does not cover the connector 44 when the board 40 is viewed in plan view, it is possible to more easily connect another connector to the connector 44. Furthermore, in the present modification, a flat facing surface 50*as* of a light distribution forming portion 50*a* facing the front surface 40*f* of the board 40 substantially in parallel extends to an outer edge of a surface of the reflector unit 50 that is adjacent to the board 40. For this reason, for example, the facing surface 50*as* can be easily formed by cutting.

In the first embodiment and the first modification, the vehicular headlamp 1 as a lamp fitting has been described as an example. However, it is sufficient if the lamp fitting as the first aspect includes a board on which a light source is mounted, a heat sink on which the board is disposed, and a reflector that presses the board against the heat sink and reflects a part of light emitted from the light source. For example, the lamp fitting as the first aspect does not have to be for a vehicle, and may emit light forming a predetermined image.

In addition, although the second aspect of the present invention has been described by taking the first embodiment as an example, the second aspect of the present invention is not limited thereto.

Figure 16:
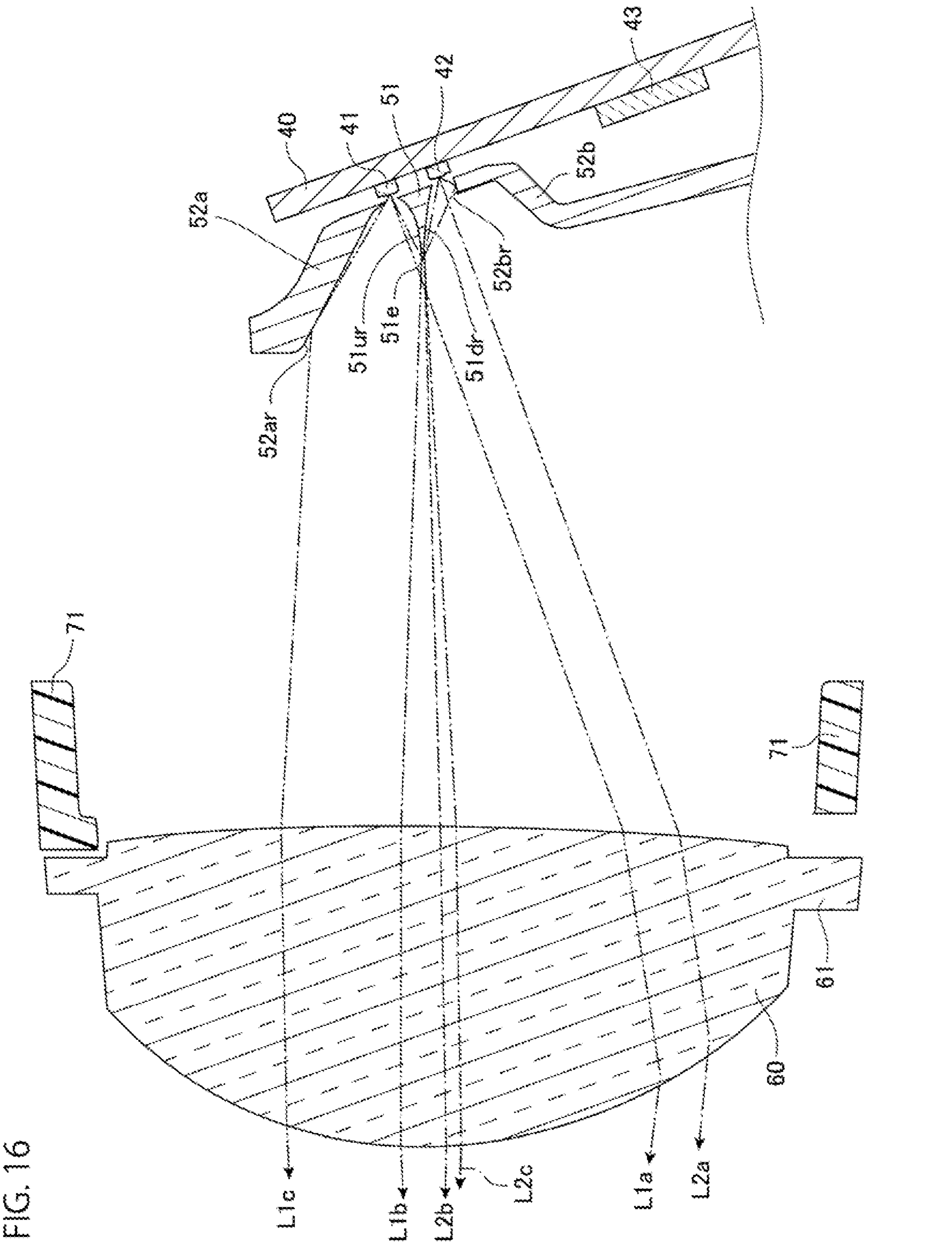
FIG. 16 is a view illustrating an optical path example of light emitted from a first light source and light emitted from a second light source according to a second modification as the second aspect similarly to FIG. 11.

For example, in the first embodiment, the first light source 41 for which the perpendicular line 41L extends away from the first reflector 51 as the perpendicular line 41L goes forward and the second light source for which the perpendicular line 42L extends toward the first reflector 51 as the perpendicular line 42L goes forward have been described as an example. However, in the second aspect, it is sufficient if the perpendicular line for one of the first light source 41 and the second light source 42 extends away from the first reflector 51 as the perpendicular line goes forward, and the perpendicular line for the other light source extends toward the first reflector 51 as the perpendicular line goes forward. For example, as illustrated in FIG. 16, the perpendicular line 41L for the first light source 41 may extend toward the first reflector 51 as the perpendicular line 41L goes forward, and the perpendicular line 42L for the second light source 42 may extend away from the first reflector 51 as the perpendicular line 42L goes forward. In the first embodiment, the first light source 41 and the second light source, which are LED arrays, have been described as an example. However, as the second aspect, the first light source 41 and the second light source are not particularly limited as long as the emission surfaces thereof have a flat plate shape.

FIG. 16 is a view illustrating an optical path example of light emitted from a first light source 41 and light emitted from a second light source 42 according to a second modification as the second aspect similarly to FIG. 11. A reflection angle, a refraction angle, and the like of light illustrated in FIG. 16 may not be accurate. In addition, the same or equivalent constituent elements as those of the first embodiment are denoted by the same reference numerals, and an overlapping description will be omitted unless otherwise specified.

As illustrated in FIG. 16, in a lamp fitting unit LU according to the present modification, a board 40 is inclined toward a rear side in an upward direction, and a light distribution forming portion 50*a* of a reflector unit 50 has a shape in which the light distribution forming portion 50*a* according to the above embodiment is vertically inverted.

In the present modification, partial light L1*a* of light emitted from the first light source 41 is directly incident on a projection lens 60 through between an upper reflective surface 51*ur* of a first reflector 51 and one second reflector 52*a*. Another partial light L1*b* is reflected toward the projection lens 60 at a part including a front end portion of the upper reflective surface 51*ur* of the first reflector 51, and is incident on the projection lens 60. Still another partial light L1*c* is reflected by a reflective surface 52*ar* of a second reflector 52*a* toward the projection lens 60 and is incident on the projection lens 60. Although not illustrated, similarly to the above embodiment, partial light diffused in the left-right direction among the rays of light emitted from the second light source 42 is reflected by a pair of lower side reflectors 54*a* and 54*b* and is incident on the projection lens 60. In this manner, a low beam light distribution pattern PL illustrated in FIG. 12 is formed by the light emitted from the first light source 41 and directly incident on the projection lens 60 and the light emitted from the first light source 41, reflected by the reflector unit 50, and incident on the projection lens 60.

In the present modification, since a perpendicular line 41L for the first light source 41 extends toward the first reflector 51 as the perpendicular line 41L goes forward, the front end portion of the reflective surface 51*ur*, which is the upper surface of the first reflector 51, can be brightened by the light from the first light source 41. Therefore, with the vehicular headlamp 1 according to the present modification as the second aspect, it is possible to suppress the vicinity of a cutoff line CL of the low beam light distribution pattern PL from becoming dark, and it is possible to suppress deterioration in visibility.

Partial light L2*a* emitted from the second light source 42 is directly incident on the projection lens 60 through between a lower reflective surface 51*dr* of the first reflector 51 and a second reflector 52*b*. Another light L2*b* is reflected toward the projection lens 60 at a part including a front end portion of the lower reflective surface 51*dr* of the first reflector 51, and is incident on the projection lens 60. Still another partial light L2*c* is reflected by the reflective surface 52*br* of the second reflector 52*b* and is reflected toward the projection lens 60 at a part including the front end portion of the reflective surface 51*dr* of the first reflector 51. Although not illustrated, similarly to the first embodiment, partial light diffused in the left-right direction among the rays of light emitted from the second light source 42 is reflected by a pair of lower side reflectors 54*a* and 54*b* and is incident on the projection lens 60. In this manner, an additional beam light distribution pattern is formed by the light emitted from the second light source 42 and directly incident on the projection lens 60 and the light emitted from the second light source 42, reflected by the reflector unit 50, and incident on the projection lens 60. The additional light distribution pattern is a light distribution pattern added to the low beam light distribution pattern PL to form a high beam light distribution pattern, and a high beam light distribution pattern PH illustrated in FIG. 13 is formed by the light from the first light source 41 and the light from the second light source 42.

In the present modification, a light flux of the light L2*b* emitted from the second light source 42 and directly incident on the front end portion of the reflective surface 51*dr* of the first reflector 51 tends to decrease, and it is difficult to brighten the front end portion. However, not only the light L2*b* but also the light L2*c* emitted from the second light source 42 and reflected by the second reflector 52*b* is incident on the front end portion of the reflective surface 51*dr* of the first reflector 51, and the light L1*b* and the light L1*c* are reflected toward the projection lens 60. Therefore, even with such a second light source 42, it is possible to prevent the front end portion of the reflective surface 51*dr*, which is the lower surface of the first reflector 51, from becoming dark. Therefore, with the vehicular headlamp 1 of the present modification as the second aspect, it is possible to suppress the vicinity of the center of the high beam light distribution pattern PH from becoming dark, and it is possible to suppress deterioration in visibility.

As described above, the vehicular headlamp 1 according to the present modification as the second aspect can reduce the number of components while suppressing the deterioration in visibility, as in the first embodiment.

In addition, in the present modification, the still another partial light L1*c* of the light emitted from the first light source 41 is reflected by the second reflector 52*a* toward the projection lens 60 with a divergence angle larger than that when the still another partial light L1*c* is incident. Therefore, with the vehicular headlamp 1 according to the present modification as the second aspect, the low beam light distribution pattern PL can be easily expanded downward. The still another partial light L1*c* may be reflected by the second reflector 52*a* toward the projection lens 60 with a divergence angle equal to or smaller than that when the still another partial light L1*c* is incident.

In addition, in the present modification, the still another partial light L2*c* of the light emitted from the second light source 42 is reflected by the second reflector 52*b* toward the first reflector 51 with a divergence angle smaller than that when the still another partial light L2*c* is incident. Therefore, with the vehicular headlamp 1 according to the present modification as the second aspect, it is possible to further suppress the vicinity of the center of the high beam light distribution pattern PH from becoming dark. In the present modification, the reflective surface 52*br* of the second reflector 52*b* that reflects the light L2*c* is a part of a spheroidal surface, and one focal point of the spheroidal surface is positioned at the front end portion of the reflective surface 51*dr* of the first reflector 51, and the other focal point is positioned at the center of an emission surface 42*s* of the second light source 42. However, as the second aspect, a shape of the reflective surface 52*br* is not particularly limited. The still another partial light L2*c* may be reflected by the second reflector 52*b* toward the first reflector 51 with a divergence angle equal to or larger than that when the still another partial light L2*c* is incident.

In the first embodiment and the second modification, the reflector unit 50 including the cover portion 50*b* that covers the integrated circuit 43 and the connector 44 has been described as an example. However, as the second aspect, the cover portion 50*b* does not have to cover at least one of the integrated circuit 43 or the connector 44, and the reflector unit 50 does not have to include the cover portion 50*b*.

In the first embodiment and the second modification, the board 40 having the recess 45 into which the protrusion 26 of the heat sink 20 is inserted has been described as an example. However, as the second aspect, the board 40 does not have to have the recess 45.

In the first embodiment and the second modification, the reflector unit 50 that presses the board 40 against the heat sink 20 has been described as an example. However, as the second aspect, the reflector unit 50 does not have to press the board 40 against the heat sink 20, and in this case, for example, the board 40 is fixed to the heat sink 20 by a screw.

Second Embodiment

Next, a second embodiment as a third aspect of the present invention will be described. The same or equivalent constituent elements as those of the first embodiment are denoted by the same reference numerals and an overlapping description will be omitted unless otherwise specified.

Figure 17:
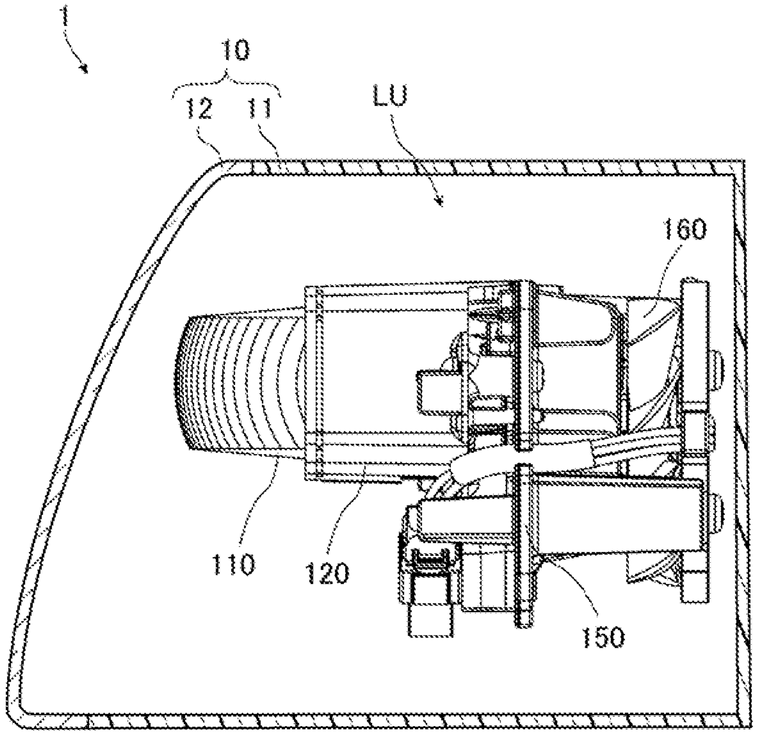
FIG. 17 is a schematic view illustrating a vehicular headlamp according to a second embodiment as a third aspect of the present invention.

FIG. 17 is a schematic view of a vehicular headlamp according to the present embodiment. As illustrated in FIG. 17, in a vehicular headlamp 1 according to the present embodiment, a configuration of a lamp fitting unit LU is different from the configuration of the lamp fitting unit LU according to the first embodiment.

Figure 18:
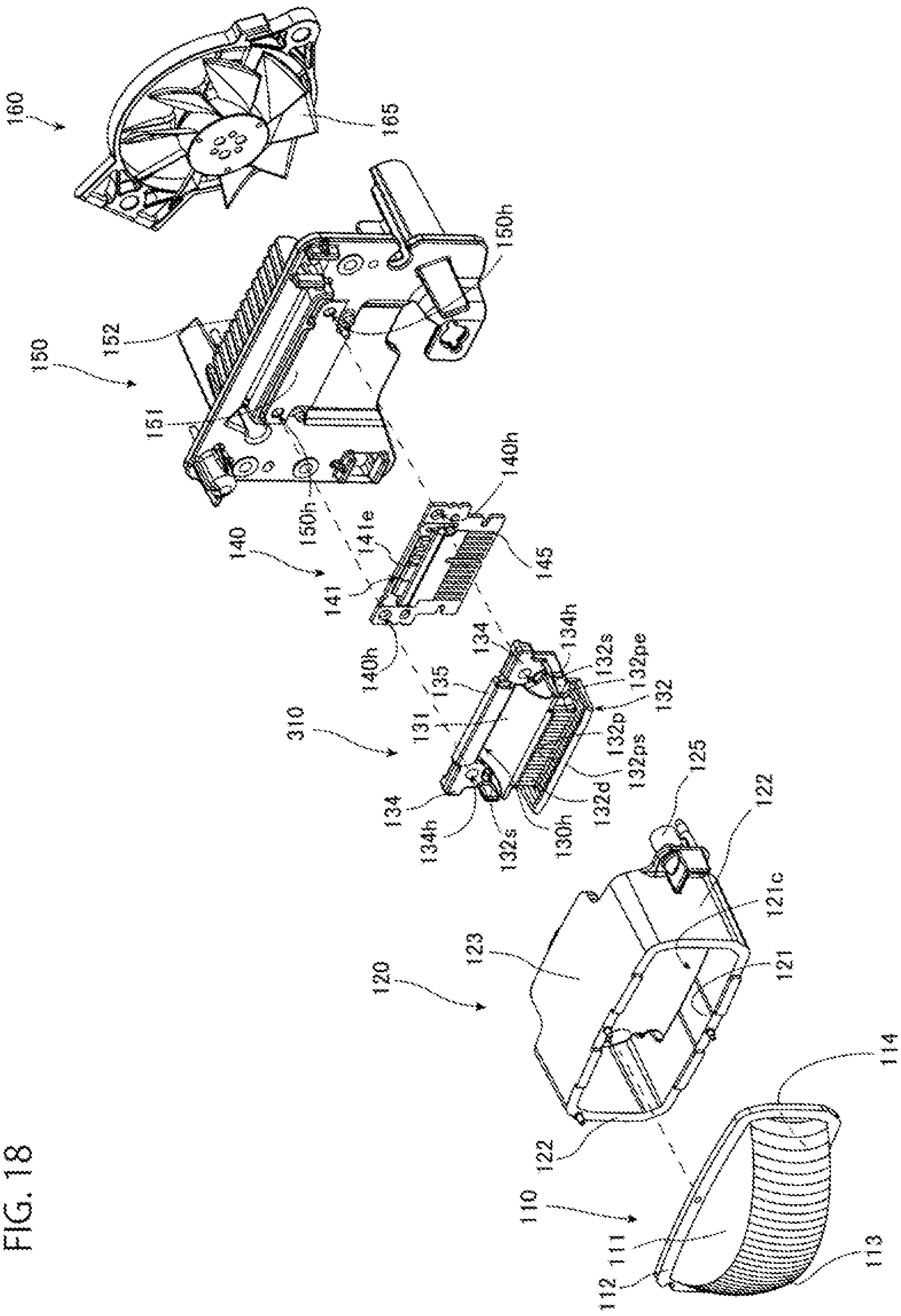
FIG. 18 is an exploded perspective view of a lamp fitting unit of FIG. 17.

FIG. 18 is an exploded perspective view of the lamp fitting unit LU illustrated in FIG. 17. As illustrated in FIG. 18, the lamp fitting unit LU includes a projection lens 110, a lens holder 120, a reflector unit 130, a board 140, a heat sink 150, and a cooling fan 160.

The projection lens 110 according to the present embodiment includes a lens main body portion 111 and a flange-shaped fixing portion 112 provided on an outer periphery of the lens main body portion 111. In the lens main body portion 111, an emission surface 113 for light is formed in a convex shape, and an incident surface 114 is formed in a convex shape having a curvature smaller than that of the emission surface 113. In addition, the lens main body portion 111 has a shape in which upper and lower portions of a circular lens in front view are each cut into a planar shape, and has a thin shape in the vertical direction. A focal plane of the projection lens 110 is substantially aligned with a light emission surface of a light emitting element described below.

The lens holder 120 has a substantially rectangular tubular shape corresponding to an outer shape of the lens main body portion 111, and includes a bottom plate portion 121, side plate portions 122 connected to both edges of the bottom plate portion 121 in the left-right direction, and a top plate portion 123 facing the bottom plate portion 121 and connected to the respective side plate portions 122. The bottom plate portion 121 and the top plate portion 123 extend substantially horizontally, and the side plate portions 122 extend substantially vertically. When the fixing portion 112 of the projection lens 110 is fixed to an edge of the lens holder 120, the lens holder 120 holds the projection lens 110, and the incident surface 114 of the projection lens 110 is exposed in a through-hole of the lens holder 120. A fixing portion 125 fixed to the heat sink 150 is provided on an outer side of each of the side plate portions 122. A recess 121*c* is formed at an edge of the bottom plate portion 121 on a side opposite to the projection lens 110.

Figure 19:
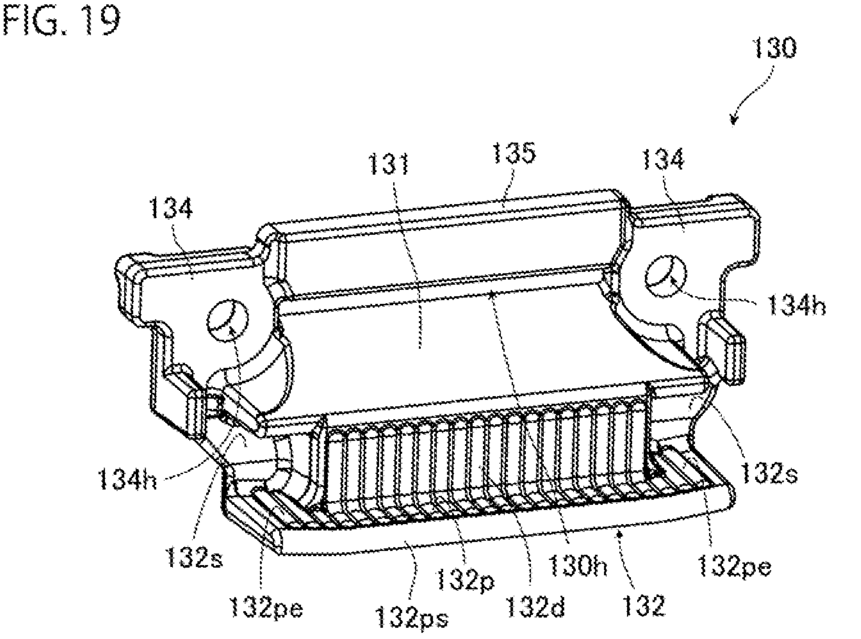
FIG. 19 is an enlarged view of a reflector unit according to the second embodiment.

FIG. 19 is a view illustrating the reflector unit 130 according to the present embodiment. The reflector unit 130 is made of metal and mainly includes a reflective portion 131, a light blocking cover 132, a fixing portion 134, and a blocking plate 135 as illustrated in FIGS. 18 and 19. Further, the reflector unit 130 has an opening 130*h* through which the emission surface of the light emitting element described below is exposed from behind. In this example, the opening 130*h* has a horizontally long substantially rectangular shape. The reflective portion 131 is a substantially trapezoidal portion extending forward and downward from immediately below the opening 130*h*, and an upper base of the reflective portion 131 is a lower edge of the opening 130*h*. A length of the upper base is substantially equal to a width of the opening 130*h* in the left-right direction. The reflective portion 131 reflects, toward the projection lens 110, light emitted from a light source exposed through the opening 130*h* forward and rearward.

The light blocking cover 132 is provided below the reflective portion 131. The light blocking cover 132 includes a light scattering portion 132*d*, a plate-shaped cover portion 132*p*, and a side cover portion 132*s*, and protects a member positioned on a side of the light blocking cover 132 that is opposite to the projection lens 110 from sunlight incident from the projection lens 110.

The light scattering portion 132*d* extends vertically downward from a lower end of the reflective portion 131. The surface of the light scattering portion 132*d* has a shape in which a plurality of semicircular columns extending in the vertical direction are arranged in parallel in the left-right direction. Therefore, light reflected by the light scattering portion 132*d* is scattered. A width of the light scattering portion 132*d* in the left-right direction is smaller than a width of a lower base of the trapezoidal reflective portion 131 and is substantially the same as a width of the upper base of the reflective portion 131.

The plate-shaped cover portion 132*p* is connected to a lower edge of the light scattering portion 132*d*. The plate-shaped cover portion 132*p* extends forward in the horizontal direction from the light scattering portion 132*d*. An upper surface of the plate-shaped cover portion 132*p* has a shape in which a plurality of semicircular columns extending in the front-rear direction are arranged in parallel in the left-right direction. Therefore, light reflected by the upper surface of the plate-shaped cover portion 132*p* is scattered. In addition, a width of the plate-shaped cover portion 132*p* in the left-right direction is smaller than a width of the bottom plate portion 121 of the lens holder 120 in the left-right direction and slightly smaller than a width of the recess 121*c*. In addition, the width is larger than the width of the light scattering portion 132*d* in the left-right direction, and each end portion 132*pe* of the plate-shaped cover portion 132*p* in the left-right direction extends rearward from the light scattering portion 132*d*. The side cover portion 132*s* is connected to a rear end of each end portion 132*pe*. Each of the side cover portions 132*s* is a plate-shaped member extending in such a way as to draw a convex arc toward a rear side in an upward direction from a connecting portion with the end portion 132*pe*. In addition, an upper surface of each of the side cover portions 132*s* is substantially flat and does not particularly have light scattering properties.

The flat-plate-shaped fixing portion 134 extending in the vertical direction is connected to a rear end of each side cover portion 132*s*. The respective fixing portions 134 are connected to left and right edges of the opening 130*h*. A screw hole 134*h* is formed in each fixing portion 134. An upper edge of the opening 130*h* is connected to the substantially rectangular flat-plate-shaped blocking plate 135. Left and right edges of the blocking plate 135 are connected to the fixing portions 134, respectively.

As illustrated in FIG. 18, a component is mounted on one surface of the board 140, and the board 140 is disposed in the vertical direction. The board 140 has a substantially rectangular shape, and screw holes 140*h* are formed near left and right corners on an upper side of the board 140. Each of the screw holes 140*h* is formed at a position overlapping a screw hole 134*h* of the reflector unit 130. Therefore, a common screw is inserted into the screw hole 134*h* and the screw hole 140*h*. A plurality of terminals 145 are provided on a lower side of the board 140, and a connector is connected thereto. A cable is connected to the connector. The connector and the cable are conductive members that supply power to the component mounted on the board 140.

A light source 141 is mounted on one surface of the board 140. The light source 141 includes a plurality of light emitting elements 141*e* that are arranged in parallel and emit light forward. Examples of such a light emitting element include an LED. In the present embodiment, the plurality of light emitting elements 141*e* are mounted on the upper side of the board 140 in parallel in the left-right direction. When the reflector unit 130 and the board 140 are disposed on the heat sink 150, the emission surfaces of the plurality of light emitting elements 141*e*, which are light emission surfaces of the light source 141, are exposed from the opening 130*h* of the reflector unit 130. The light source 141 is interposed between the pair of screw holes 140*h* in the left-right direction. In addition, in addition to the light source 141, electronic components are mounted on the board 140.

The heat sink 150 includes a base plate 151 on which the board 140 is disposed, and a plurality of cooling fins 152 arranged in parallel on a side of the base plate 151 that is opposite to the board 140. In the base plate 151, screw holes 150*h* are formed at positions corresponding to the screw holes 134*h* of the reflector unit 130 and the screw holes 140*h* of the board 140. Therefore, screws fixed to the screw holes 150*h* are inserted into the screw holes 134*h* and 140*h*. In a case where the board 140 is disposed on the heat sink 150, it is preferable that thermally conductive grease is interposed between the base plate 151 and the board 140.

Figure 20:
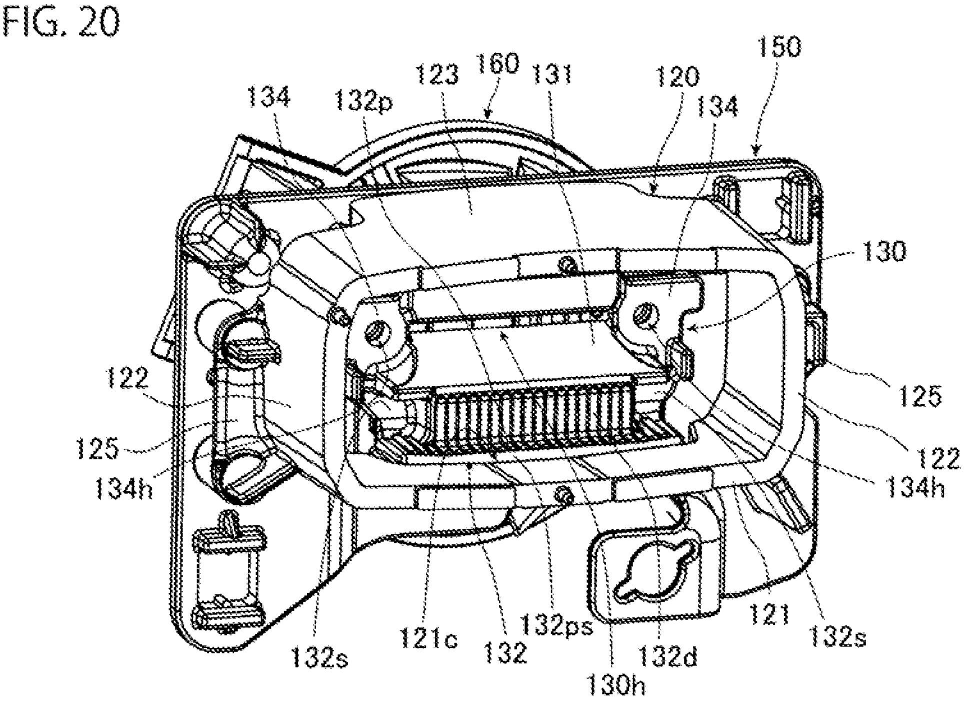
FIG. 20 is a perspective view of the lamp fitting unit from which a projection lens is removed according to the second embodiment.

FIG. 20 is a view of the lamp fitting unit LU from which the projection lens 110 is removed according to the present embodiment. As illustrated in FIG. 20, the reflector unit 130 is fixed to the heat sink 150 together with the board 140 by the screws inserted into the screw holes 134*h* and 140*h* and fixed to the screw holes 150*h*. In addition, the fixing portion 125 of the lens holder 120 is screwed to the heat sink 150, whereby the lens holder 120 is fixed to the heat sink 150. In this state, a part of the plate-shaped cover portion 132*p* of the reflector unit 130 enters the recess 121*c* formed in the bottom plate portion 121 of the lens holder 120. As the part of the plate-shaped cover portion 132*p* enters the recess 121*c* in this manner, it is possible to suppress misalignment between the reflector unit 130 and the lens holder 120 in the left-right direction.

Figure 21:
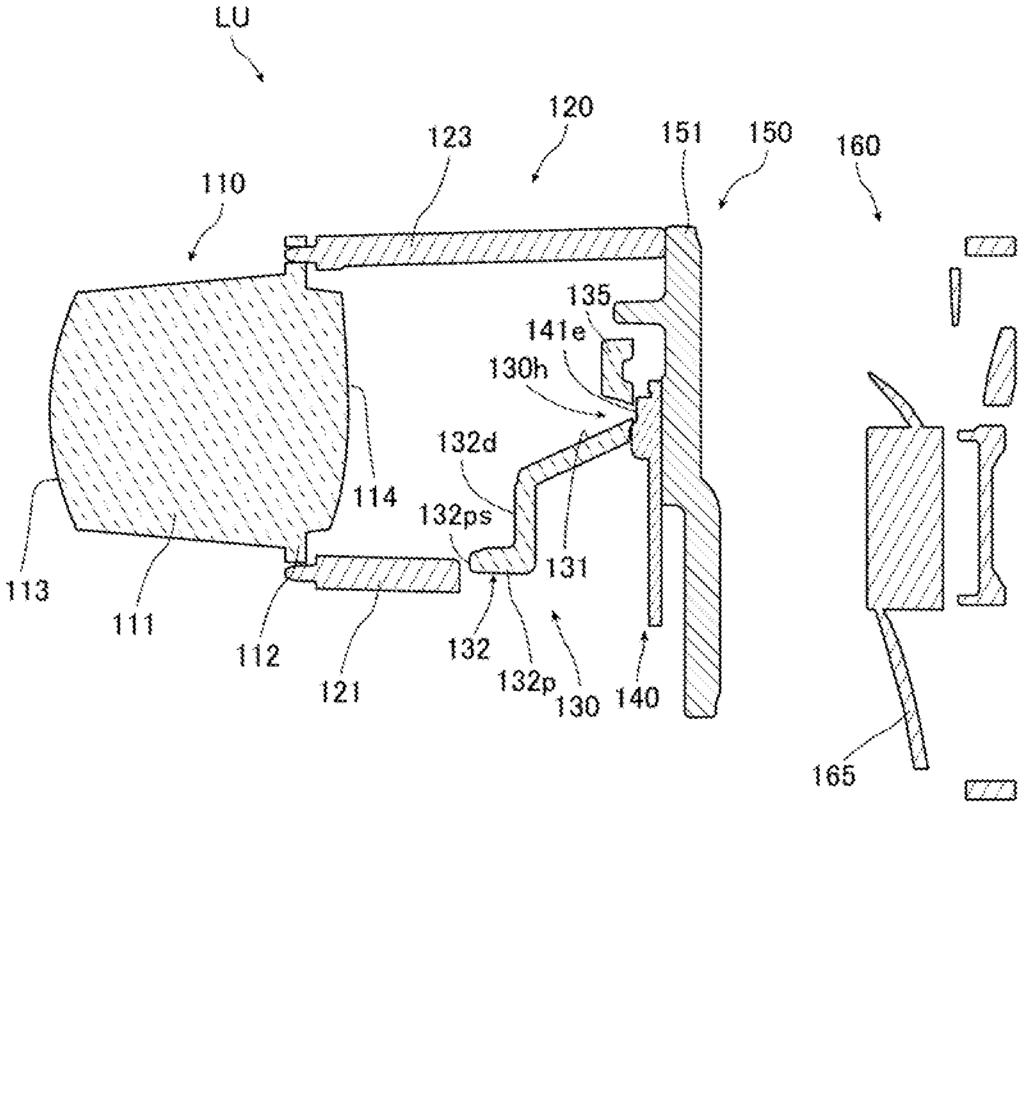
FIG. 21 is a vertical cross-sectional view of the lamp fitting unit according to the second embodiment.

FIG. 21 is a vertical cross-sectional view of the lamp fitting unit LU according to the present embodiment. Since FIG. 21 is a cross-sectional view passing between the cooling fins 152, the cooling fins 152 are not illustrated in FIG. 21. In a state in which the lens holder 120 is fixed to the heat sink 150, a part of a side surface 132*ps* of the plate-shaped cover portion 132*p* and a side surface of the bottom plate portion 121 face each other as illustrated in FIG. 21. Therefore, the part of the plate-shaped cover portion 132*p* and the side surface 132*ps* overlap the bottom plate portion 121 in an extending direction of the bottom plate portion 121. It is more preferable that the entire side surface 132*ps* of the plate-shaped cover portion 132*p* and the bottom plate portion 121 overlap in the extending direction of the bottom plate portion 121.

Figure 22:
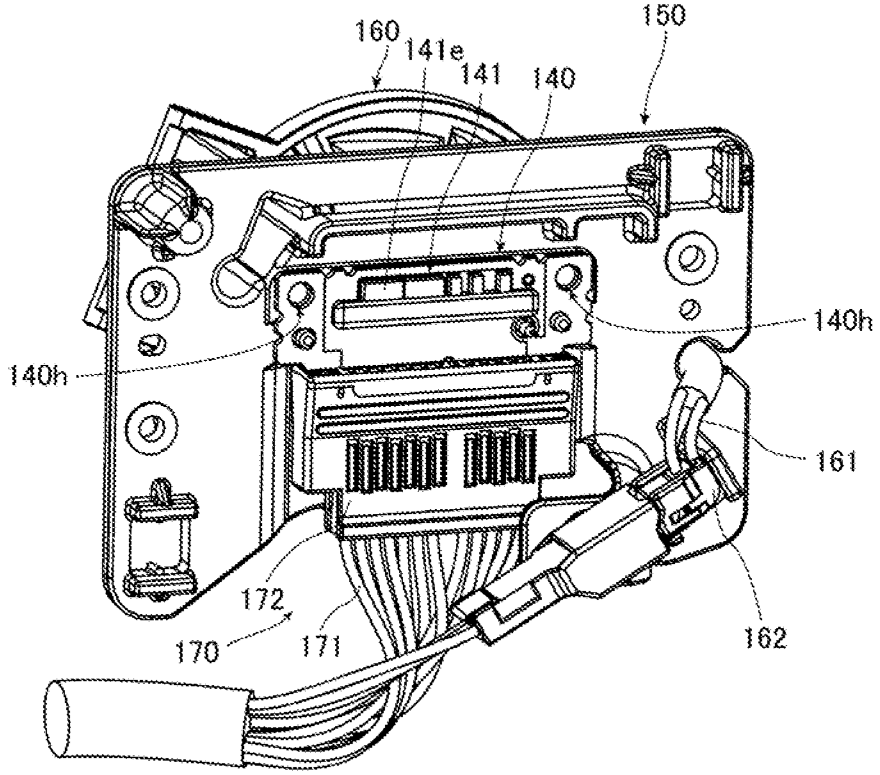
FIG. 22 is a perspective view of the lamp fitting unit according to the second embodiment from which the projection lens, a lens holder, and the reflector unit are removed.

The cooling fan 160 including rotating blades 165 is disposed on the plurality of cooling fins 152 of the heat sink 150. As described above, since the cooling fins 152 are not illustrated in FIG. 21, the heat sink 150 and the cooling fan 160 appear to be separated from each other in FIG. 21. FIG. 22 is a view of the lamp fitting unit LU from which the projection lens 110, the lens holder 120, and the reflector unit 130 are removed. As illustrated in FIG. 22, the cooling fan 160 includes a cable 161 that supplies power to the cooling fan 160 and a connector 162. The cable 161 and the connector 162 are not illustrated in FIGS. 18, 20, and 21. The cable 161 has a configuration in which a conductive wire is covered with an insulating resin, and the connector 162 has a configuration in which a resin case covers a terminal of a conductor. The rotating blade 165 is rotated by power supplied from the cable 161 and the connector 162, and air is blown between the cooling fins 152. Therefore, the cable 161 and the connector 162 are conductive members that supply power for driving the cooling fan 160.

As can be understood from comparison between FIG. 20 and FIG. 22, in the present embodiment, the cable 161 and the connector 162 are disposed below the reflective portion 131, and the connector 162 is hidden behind a lower portion of the plate-shaped cover portion 132*p* or a lower portion of the side cover portion 132*s* of the reflector unit 130.

FIG. 22 illustrates a cable unit 170 connected to the board 140. The cable unit 170 includes a cable 171 and a connector 172. The connector 172 has a configuration in which a resin case covers a plurality of terminals (not illustrated). In a state in which the connector 172 is connected to the board 140 as illustrated in FIG. 22, the plurality of terminals of the connector 172 are connected to the terminals 145, respectively. The configuration of the cable 171 is similar to the configuration of the cable 161, and a conductor of the cable 171 is connected to each terminal of the connector 172. Each light emitting element 141*e* of the light source 141 emits light by power supplied from the cable 171 and the connector 172. Therefore, the cable 171 and the connector 172 are conductive members that supply power for emitting light from the light source 141. In the present embodiment, the cable 171 and the connector 172 are disposed below the reflective portion 131, and the cable 171 and the connector 172 are hidden by the lower portion of the plate-shaped cover portion 132*p* of the reflector unit 130.

That is, the light blocking cover 132 of the reflector unit 130 is positioned between the projection lens 110 and the conductive members, and protects the conductive members that supplies power for driving the cooling fan 160 and the conductive members that supplies power for emitting light from the light source 141 from sunlight incident from the projection lens 110.

In the vehicular headlamp 1 having the above configuration, power is supplied from the terminal 145 provided on the board 140. A circuit on the board 140 is operated by the power, the power is supplied to each light emitting element 141*e*, and each light emitting element 141*e* emits light. In this way, light is emitted from the light source 141, and the light is emitted through the opening 130*h* of the reflector unit 130. Among the rays of light emitted from the light source 141, light along an optical axis is directly incident on the projection lens 110. On the other hand, light emitted from the light source 141 forward and rearward is reflected forward by the reflective portion 131 of the reflector unit 130 and is incident on the projection lens 110. The light emitted from the light source 141 and incident on the projection lens 110 is transmitted through the projection lens 110 and emitted in a predetermined light distribution pattern.

Meanwhile, in Patent Literature 2 described above, suppression of damage of the lens holder is considered, but damage of a conductive member such as a cable or a connector that supplies power to a light source or a cooling fan is not considered. Such a conductive member generally includes a resin that covers a conductive wire or the like, and thus may be damaged when sunlight is concentrated. In addition, there is a demand for cost reduction in order to suppress the damage.

Therefore, the vehicular headlamp 1 according to the present embodiment: includes the light source 141, the reflector unit 130 including the reflective portion 131 that reflects, forward, the light emitted from the light source 141 forward and rearward, the projection lens 110 that transmits the light reflected by the reflective portion 131, and the conductive members such as the cable 161 and the connector 162 disposed below the reflective portion 131.

The reflector unit 130 includes the light blocking cover 132 formed integrally with the reflective portion 131 and positioned between the projection lens 110 and the conductive members below the reflective portion 131. Therefore, it is possible to suppress irradiation of the conductive members with sunlight incident through the projection lens 110. In addition, the reflective portion 131 usually has a light blocking property. Therefore, it is possible to suppress damage of the conductive members due to sunlight at low cost by integrating the light blocking cover 132 and the reflective portion 131 both having a light blocking property.

In the vehicular headlamp 1 according to the present embodiment, at least a part of the side surface 132*ps* of the plate-shaped cover portion 132*p* of the reflector unit 130 overlaps the bottom plate portion 121 of the lens holder 120 in the extending direction. In a case where the plate-shaped cover portion 132*p* does not overlap the bottom plate portion 121 in the extending direction and the plate-shaped cover portion 132*p* is positioned on a level lower than the bottom plate portion 121, sunlight propagating toward the plate-shaped cover portion 132*p* may damage the lens holder 120. In a case where the plate-shaped cover portion 132*p* is positioned on a level higher than the bottom plate portion 121, sunlight propagating toward the plate-shaped cover portion 132*p* is reflected by the entire side surface 132*ps* of the plate-shaped cover portion 132*p*, and the reflected light can damage the lens holder 120. Therefore, as described above, the plate-shaped cover portion 132*p* overlaps the bottom plate portion 121 in the extending direction, and it is thus possible to suppress sunlight propagating toward the plate-shaped cover portion 132*p* from damaging the lens holder 120. As long as the sunlight propagating toward the plate-shaped cover portion 132*p* may be reflected by the side surface 132*ps* of the plate-shaped cover portion 132*p*, the plate-shaped cover portion 132*p* does not have to overlap the bottom plate portion 121 in the extending direction.

In addition, in the vehicular headlamp 1 according to the present embodiment, the upper surface of the plate-shaped cover portion 132*p* scatters and reflects incident light, and thus, sunlight propagating toward the plate-shaped cover portion 132*p* is scattered, and it is possible to suppress the other members from being damaged by the reflected sunlight. The upper surface of the plate-shaped cover portion 132*p* does not have to scatter and reflect incident light.

In the vehicular headlamp 1 according to the present embodiment, the light scattering portion 132*d* is provided between the reflective portion 131 and the plate-shaped cover portion 132*p*. Therefore, even in a case where the plate-shaped cover portion 132*p* and the reflective portion 131 are separated from each other, sunlight propagating between the plate-shaped cover portion 132*p* and the reflective portion 131 is scattered, and it is possible to suppress the other members from being damaged by the reflected sunlight. A member that does not scatter light may be provided between the reflective portion 131 and the plate-shaped cover portion 132*p*.

Furthermore, in the vehicular headlamp 1 according to the present embodiment, the width of the plate-shaped cover portion 132*p* in the left-right direction is larger than the width of the light scattering portion 132*d* in the left-right direction, and each end portion 132*pe* of the plate-shaped cover portion 132*p* in the left-right direction extends rearward from the light scattering portion 132*d*. Therefore, a range of the conductive members that can be protected by the plate-shaped cover portion 132*p* can be widened. In addition, since the light blocking cover 132 includes the side cover portion 132*s* extending rearward and upward from the rear end of each end portion 132*pe*, the range of the conductive members that can be protected by the light blocking cover 132 can be further widened. Such a side cover portion 132*s* is not an essential component.

Although the third aspect of the present invention has been described by taking the second embodiment as an example, the third aspect of the present invention is not limited thereto.

For example, in the second embodiment, the configuration in which the light source 141 includes the plurality of light emitting elements 141*e* has been described, but the light source 141 may include a single light emitting element.

Third Embodiment

Next, a third embodiment as a fourth aspect of the present invention will be described. The same or equivalent constituent elements as those of the second embodiment are denoted by the same reference numerals and an overlapping description will be omitted unless otherwise specified.

Figure 23:
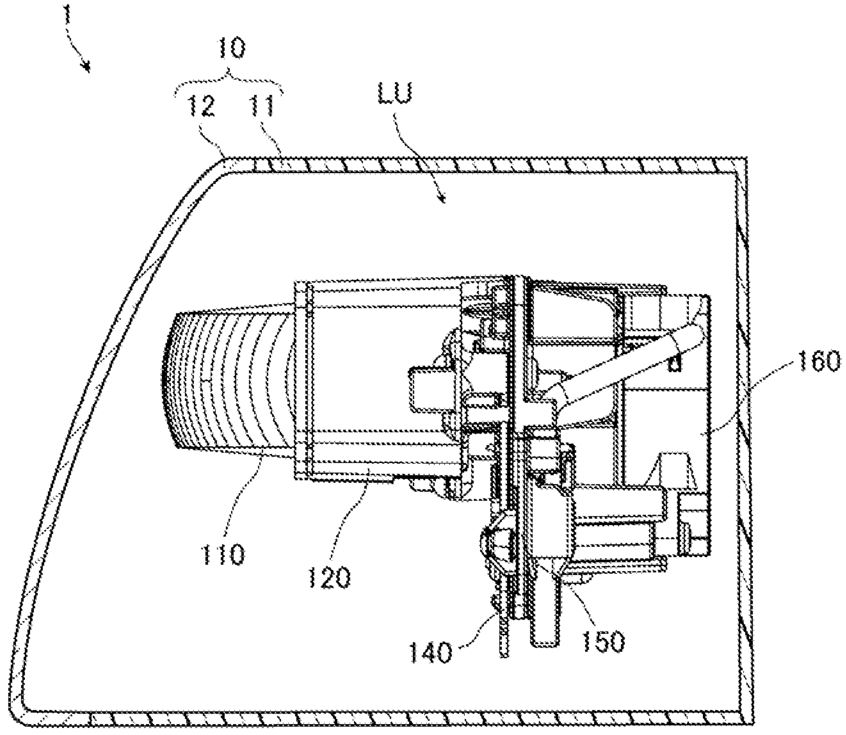
FIG. 23 is a schematic view illustrating a vehicular headlamp according to a third embodiment as a fourth aspect of the present invention.
Figure 24:
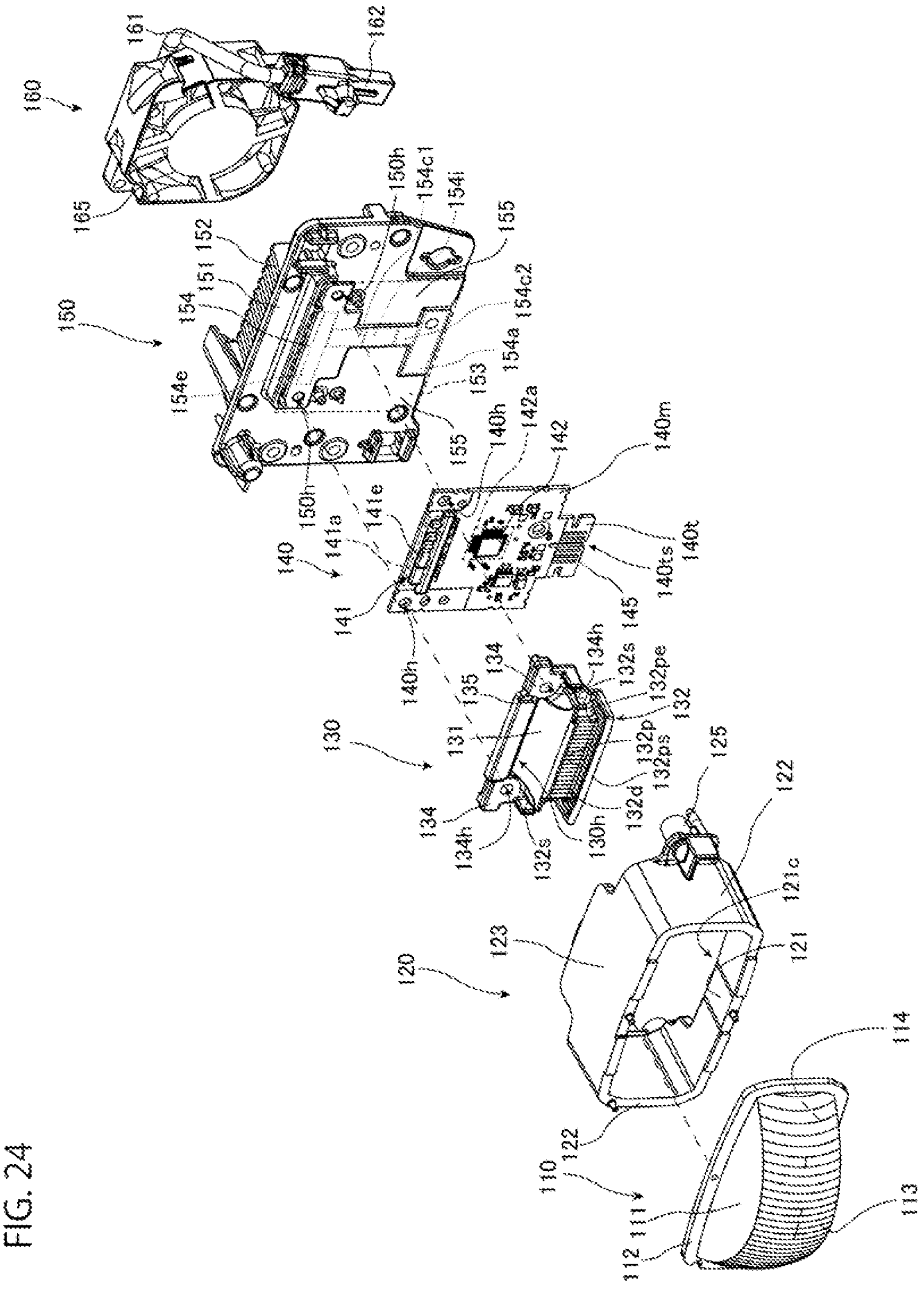
FIG. 24 is an exploded perspective view of a lamp fitting unit of FIG. 23.

FIG. 23 is a schematic view of a vehicular headlamp according to the present embodiment. FIG. 24 is an exploded perspective view of a lamp fitting unit LU. As illustrated in FIGS. 23 and 24, in the vehicular headlamp 1 according to the present embodiment, configurations of a board 140, a heat sink 150, and a cooling fan 160 of the lamp fitting unit LU are different from the configurations of the board 140, the heat sink 150, and the cooling fan 160 of the lamp fitting unit LU according to the second embodiment.

Figure 25:
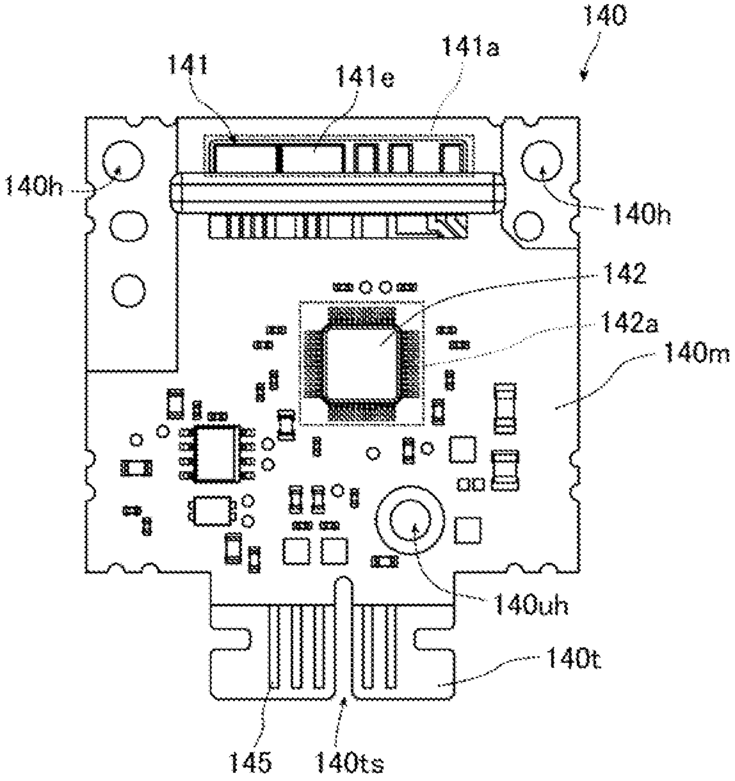
FIG. 25 is a front view of a board according to the third embodiment.

FIG. 25 is a front view of the board 140 according to the present embodiment. As illustrated in FIGS. 24 and 25, the board 140 includes a main body portion 140*m* on which a component is mounted on one surface thereof and a tail portion 140*t*, and is disposed in the vertical direction. The main body portion 140*m* has a substantially square shape, and screw holes 140*h* are formed near left and right corners on an upper side of the main body portion 140*m*. Each of the screw holes 140*h* is formed at a position overlapping a screw hole 134*h* of the reflector unit 130. Therefore, the board 140 is fixed to the heat sink 150 together with the reflector unit 130 as described above by screws inserted into the screw holes 134*h* and the screw holes 140*h*. The tail portion 140*t* is connected to a lower side of the main body portion 140*m*, has a width smaller than that of the main body portion 140*m* in the left-right direction, and is divided into left and right portions by a slit 140*ts*. The tail portion 140*t* includes a plurality of terminals 145, and the tail portion 140*t* functions as a card edge connector. Therefore, a connector (not illustrated) is connected to the tail portion 140*t*, and a cable is connected to the connector. The connector and the cable are conductive members that supply power to the component mounted on the board 140.

A light source 141 and an integrated circuit 142 are mounted on one surface of the main body portion 140*m*. The light source 141 includes a plurality of light emitting elements 141*e* that are arranged in parallel and emit light forward. Examples of such a light emitting element include an LED. In the present embodiment, the plurality of light emitting elements 141*e* are mounted in parallel in the left-right direction in a light source mounting region 141*a* provided on the upper side of the main body portion 140*m*. When the reflector unit 130 and the board 140 are disposed on the heat sink 150, the emission surfaces of the plurality of light emitting elements 141*e*, which are light emission surfaces of the light source 141, are exposed from the opening 130*h* of the reflector unit 130. The light source mounting region 141*a* is interposed between the screw holes 140*h* in the left-right direction. The integrated circuit 142 is electrically connected to each light emitting element 141*e* by a wiring (not illustrated) on the board, and performs switching of power supply to the light source 141. The integrated circuit 142 is mounted in an integrated circuit mounting region 142*a* provided substantially at the center of the one surface of the main body portion 140*m*. In addition, another electronic component is mounted on the board 140. In the board 140, another screw hole 140*uh* is formed below the integrated circuit in addition to the upper two screw holes.

Figure 26:
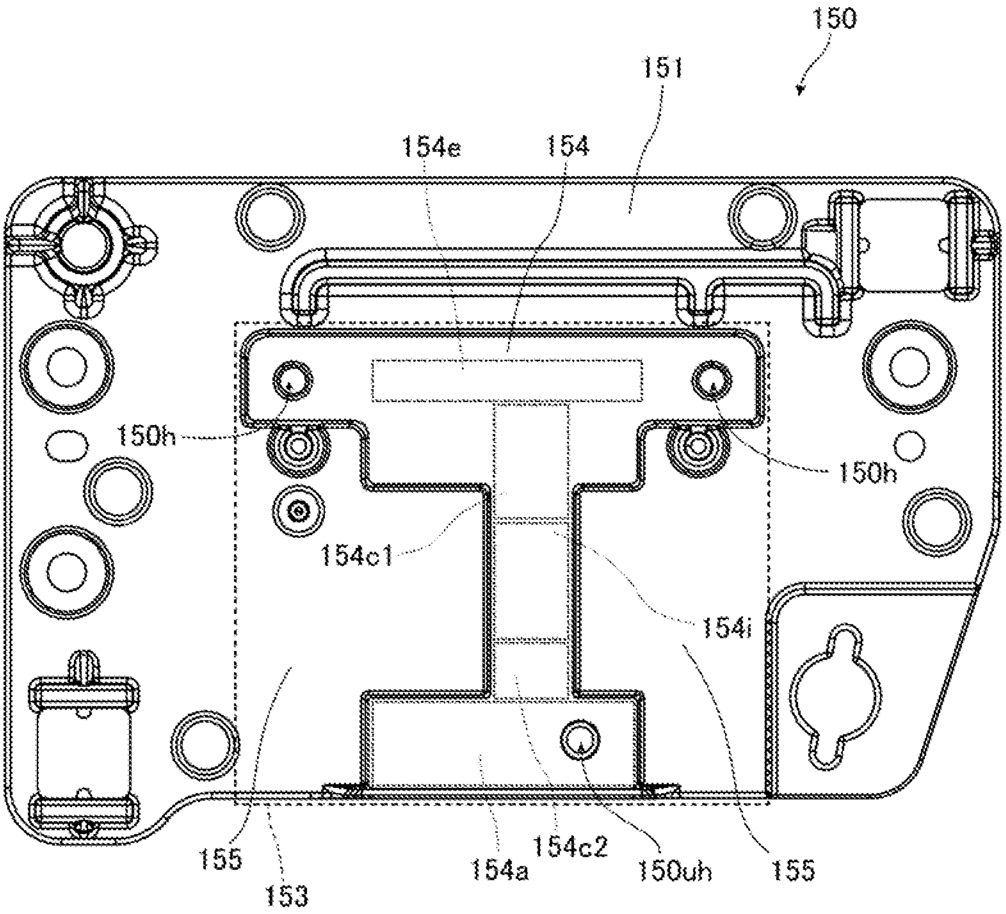
FIG. 26 is a front view of a heat sink according to the third embodiment.

FIG. 26 is a front view of the heat sink 150 according to the present embodiment. As illustrated in FIGS. 24 and 26, the heat sink 150 includes a base plate 151 on which the board 140 is disposed, and a plurality of cooling fins 152 arranged in parallel on a side of the base plate 151 that is opposite to the board 140.

Figure 27:
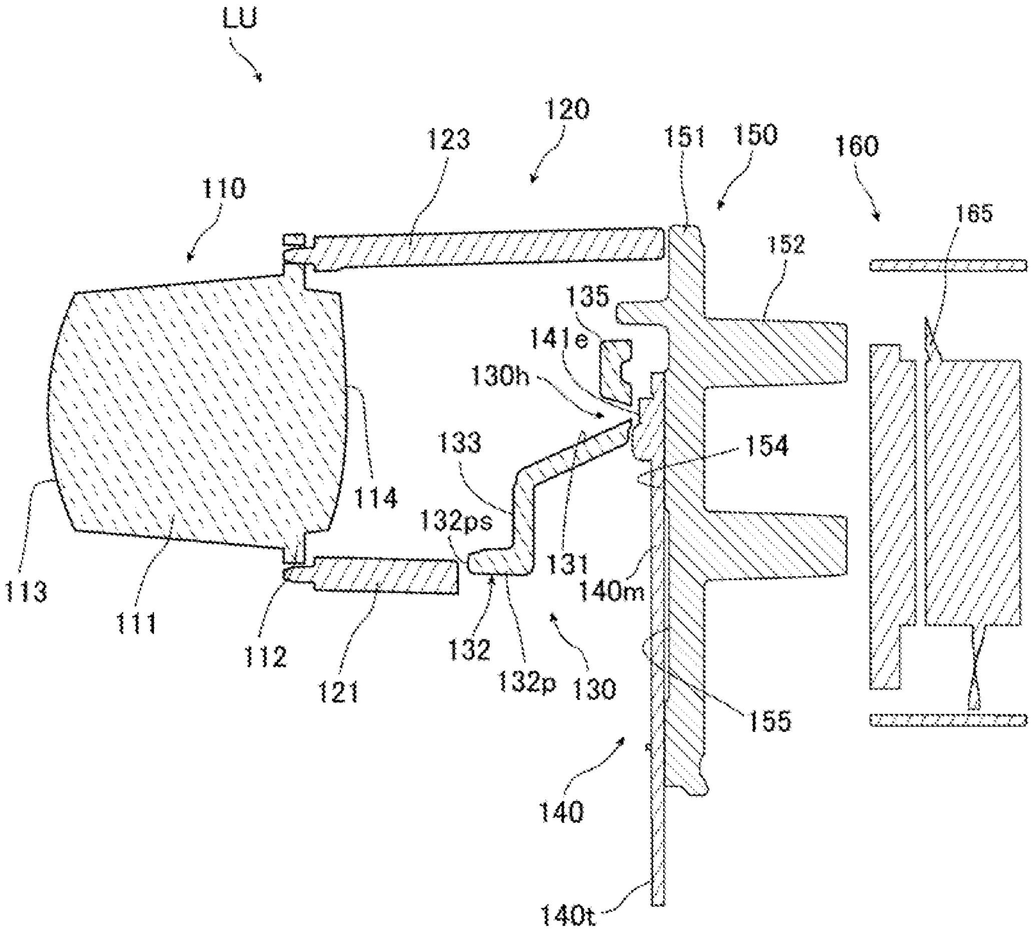
FIG. 27 is a vertical cross-sectional view of the lamp fitting unit according to the third embodiment.

The base plate 151 has a board facing region 153 indicated by a broken line in a surface of the base plate 151 that faces the board 140. The board facing region 153 includes a disposition portion 154 that faces the board 140 and on which the board 140 is disposed, and a separated portion 155 that is separated from the board 140 in a thickness direction of the board 140 when the board 140 is disposed on the disposition portion 154. FIG. 27 is a vertical cross-sectional view of the lamp fitting unit LU according to the present embodiment. As illustrated in FIG. 27, the disposition portion 154 protrudes toward the board 140 from the separated portion 155. Therefore, when the board 140 is disposed on the disposition portion 154, the separated portion 155 is separated from the board 140 as described above.

As illustrated in FIG. 26, the disposition portion 154 includes a light source facing region 154*e*, an integrated circuit facing region 154*i*, a first coupling region 154*cl*, an adjustment region 154*a*, and a second coupling region 154*c*2 having the same height.

The light source facing region 154*e* faces a rear surface of the light source mounting region 141*a* of the board 140 in which the light source 141 is mounted. Therefore, the light source facing region 154*e* faces the light source 141 via the board 140. As described above, the light source 141 includes the plurality of light emitting elements 141*e* arranged in parallel in the left-right direction. Therefore, the light source facing region 154*e* extends in the left-right direction, which is a parallel arrangement direction of the plurality of light emitting elements 141*e*.

Screw holes 150*h* are formed on both sides of the light source facing region 154*e* in the left-right direction in the disposition portion 154. The screw hole 150*h* is formed at a position corresponding to the screw hole 140*h* of the board 140, and a screw inserted into the screw hole 134*h* of the reflector unit 130 and the screw hole 140*h* of the board 140 is fixed to the screw hole 150*h*, and the reflector unit 130 and the board 140 are fixed to the heat sink 150 by fixing the screw. At this time, the reflector unit 130 presses the periphery of the screw hole 140*h* of the board 140 against the disposition portion 154. As described above, both sides of the light source mounting region 141*a* of the board 140 are pressed against the same surface as the light source mounting region 141*a*, so that the rear surface of the light source mounting region 141*a* is prevented from floating from the heat sink 150. A distance from ends of the disposition portion 154 between which the pair of screw holes 150*h* are interposed is substantially the same as a width of the main body portion 140*m* of the board 140 in the left-right direction.

The integrated circuit facing region 154*i* faces a rear surface of the integrated circuit mounting region 142*a* of the board 140 in which the integrated circuit 142 is mounted. Therefore, the integrated circuit facing region 154*i* faces the integrated circuit 142 via the board 140. A width of the integrated circuit facing region 154*i* in the left-right direction is smaller than the width of the main body portion 140*m* of the board 140 in the left-right direction, and is slightly smaller than a width of the integrated circuit mounting region 142*a* in the left-right direction in the present embodiment. Therefore, in the present embodiment, the integrated circuit facing region 154*i* faces a part of the rear surface of the integrated circuit mounting region 142*a*. However, the width of the integrated circuit facing region 154*i* in the left-right direction may be equal to or larger than the width of the integrated circuit mounting region 142*a* in the left-right direction, and the integrated circuit facing region 154*i* may face the entire rear surface of the integrated circuit mounting region 142*a*.

The adjustment region 154*a* is provided at a position facing the lower side of the main body portion 140*m* of the board 140, in the heat sink 150. The adjustment region 154*a* extends in the left-right direction, and a width of the adjustment region 154*a* in the left-right direction is smaller than the width of the main body portion 140*m* of the board 140 in the left-right direction and larger than the width of the integrated circuit facing region 154*i* in the left-right direction. The adjustment region 154*a* has a function of adjusting a height of the surface on which the board is disposed on the heat sink 150 to prevent the lower side of the board 140 from being unstable when the board 140 is disposed. A screw hole 150*uh* is formed in the adjustment region 154*a*. The screw hole 150uh is provided at a position corresponding to the screw hole 140uh of the board 140. Therefore, as the screw inserted into the screw hole 140uh is fixed to the screw hole 150uh, the board 140 is pressed against and fixed to the adjustment region 154a. As described above, since the screw hole 150uh is formed in the adjustment region 154a wider than the integrated circuit facing region, the board 140 is stably fixed to the heat sink 150.

The first coupling region 154cl is a region that couples the light source facing region 154e and the integrated circuit facing region 154i. The first coupling region 154cl extends in the vertical direction. Therefore, the first coupling region 154cl extends in a direction perpendicular to an extending direction of the light source facing region 154e, and couples the light source facing region 154e and the integrated circuit facing region 154i at the shortest distance. In addition, the second coupling region 154c2 is a region that couples the adjustment region 154a and the integrated circuit facing region 154i. Similarly to the first coupling region 154cl, the second coupling region 154c2 couples the adjustment region 154a and the integrated circuit facing region 154i at the shortest distance. Therefore, the first coupling region 154c1, the integrated circuit facing region 154i, and the second coupling region 154c2 are linearly arranged in a direction perpendicular to an extending direction of the integrated circuit facing region 154i. In the present embodiment, the first coupling region 154c1, the integrated circuit facing region 154i, and the second coupling region 154c2 have the same width in the extending direction of the integrated circuit facing region 154i.

The separated portion 155 is positioned on both sides of the first coupling region 154cl, the integrated circuit facing region 154i, and the second coupling region 154c2 in the left-right direction. That is, at least the separated portion 155 is provided in a region other than a region including the light source facing region 154e, the integrated circuit facing region 154i, and the first coupling region 154cl connecting the light source facing region 154e and the integrated circuit facing region 154i at the shortest distance. Moreover, in the present embodiment, the separated portion 155 is provided in a region other than a region including the adjustment region 154a, the integrated circuit facing region 154i, and the second coupling region 154c2 connecting the adjustment region 154a and the integrated circuit facing region 154i at the shortest distance.

In a case where the board 140 is disposed on the heat sink 150, it is preferable that thermally conductive grease is interposed between the disposition portion 154 and the board 140.

As illustrated in FIG. 24, the cooling fan 160 is disposed on the plurality of cooling fins 152 of the heat sink 150. The cooling fan 160 includes a cable 161 and a connector 162 which are conductive members for supplying power to the cooling fan 160. The cable 161 has a configuration in which an insulating resin covers a conductive wire, and the connector 162 has a configuration in which a resin case covers a terminal of the conductor. Rotating blades 165 are rotated by the power supplied from the conductive members, and air is blown between the cooling fins 152.

In the vehicular headlamp 1 having the above configuration, power is supplied from the terminals provided in the tail portion 140t functioning as the card edge connector of the board 140. The integrated circuit 142 performs switching by the power, and the power is supplied to each light emitting element 141e by the switching, and each light emitting element 141e emits light. In this way, light is emitted from the light source 141, and the light is emitted through the opening 130h of the reflector unit 130. Among the rays of light emitted from the light source 141, light along an optical axis is directly incident on the projection lens 110. On the other hand, light emitted from the light source 141 forward and rearward is reflected forward by the reflective portion 131 of the reflector unit 130 and is incident on the projection lens 110. The light emitted from the light source 141 and incident on the projection lens 110 is transmitted through the projection lens 110 and emitted in a predetermined light distribution pattern.

Meanwhile, the tail portion 140t of the board 140 according to the present embodiment is hidden by the lower portion of the plate-shaped cover portion 132p of the reflector unit 130. Therefore, the connector to which the tail portion 140t is connected is also hidden by the lower portion of the plate-shaped cover portion 132p. Therefore, in the present embodiment, the light blocking cover 132 of the reflector unit 130 is positioned between the projection lens 110 and the conductive members that supply power for driving the light source 141, and protects the conductive members from sunlight incident from the projection lens 110.

As illustrated in FIG. 27, in the vehicular headlamp 1 according to the present embodiment, a part of the side surface 132ps of the plate-shaped cover portion 132p of the reflector unit 130 overlaps the bottom plate portion 121 of the lens holder 120 in the extending direction. In a case where the side surface 132ps of the plate-shaped cover portion 132p does not overlap the bottom plate portion 121 in the extending direction and the plate-shaped cover portion 132p is positioned on a level lower than the bottom plate portion 121, sunlight propagating toward the plate-shaped cover portion 132p may damage the lens holder 120. In a case where the plate-shaped cover portion 132p is positioned on a level higher than the bottom plate portion 121, sunlight propagating toward the plate-shaped cover portion 132p is reflected by the entire side surface 132ps of the plate-shaped cover portion 132p, and the reflected light can damage the lens holder 120. Therefore, as described above, the side surface 132ps of the plate-shaped cover portion 132p overlaps the bottom plate portion 121 in the extending direction, and it is thus possible to suppress sunlight propagating toward the plate-shaped cover portion 132p from damaging the lens holder 120. It is more preferable that the entire side surface 132ps of the plate-shaped cover portion 132p and the bottom plate portion 121 overlap in the extending direction of the bottom plate portion 121. Further, as long as the sunlight propagating toward the plate-shaped cover portion 132p may be reflected by the side surface 132ps of the plate-shaped cover portion 132p, the plate-shaped cover portion 132p does not have to overlap the bottom plate portion 121 in the extending direction.

Incidentally, there is a case where an integrated circuit used for switching of a light emitting element or the like is mounted on the same board as the light emitting element for the purpose of downsizing a vehicular headlamp or the like. Since heat is generally generated also from the integrated circuit, it is preferable that heat is efficiently released also in this case.

Therefore, in the vehicular headlamp 1 according to the present embodiment, the board facing region 153 of the heat sink 150 that faces the board 140 includes the separated portion 155 separated from the board 140, and the disposition portion 154 that protrudes toward the board 140 from the separated portion 155 and in which the board 140 is disposed. The disposition portion 154 includes the light source facing region 154e facing the rear surface of the light source mounting region 141a of the board 140 in which the light source 141 is mounted, the integrated circuit facing region 154*i* facing the rear surface of the integrated circuit mounting region 142*a* of the board 140 in which the integrated circuit 142 is mounted, and the first coupling region 154*cl* coupling the light source facing region 154*e* and the integrated circuit facing region 154*i*.

With the vehicular headlamp 1 according to the present embodiment as described above, heat generated from the light source 141 and the integrated circuit 142 is conducted mainly from the light source facing region 154*e* and the integrated circuit facing region 154*i* to the heat sink 150 via the board 140, and is dissipated. By the way, as heat generated from the light source 141 and the integrated circuit 142 is conducted through the board 140, a region between the light source mounting region 141*a* and the integrated circuit mounting region 142*a* of the board 140 may be heated. With the vehicular headlamp 1 according to the present embodiment, heat in this region can be conducted from the first coupling region 154*cl* to the heat sink 150 to dissipate heat. In addition, as the separated portion 155 is provided, it is possible to suppress unnecessary return of the heat conducted to the heat sink 150 from the heat sink 150 to the board 140. Therefore, the vehicular headlamp 1 according to the present embodiment can efficiently release heat.

In addition, in the vehicular headlamp 1 according to the present embodiment, the light source facing region 154*e* extends in the parallel arrangement direction of the plurality of light emitting elements 141*e*, and the integrated circuit facing region 154*i* overlaps a straight line orthogonal to a line segment connecting the light emitting elements 141*e* positioned at both ends. With such a configuration, the extending direction of the light source facing region 154*e* and an extending direction of a region including the integrated circuit facing region 154*i* and the first coupling region 154*cl* can be orthogonal to each other. Therefore, the board 140 can be stably disposed on the heat sink 150.

Furthermore, in the vehicular headlamp 1 according to the present embodiment, the separated portion 155 is positioned on both sides of the first coupling region 154*cl* in the parallel arrangement direction of the light emitting elements 141*e*. Therefore, heat conducted to the heat sink 150 can be further suppressed from returning to the board 140 as compared with a case where the separated portion 155 is not positioned on both sides of the first coupling region 154*c*1.

Furthermore, in the vehicular headlamp 1 according to the present embodiment, the adjustment region 154*a* extends in the parallel arrangement direction of the light emitting elements 141*e* over a width larger than that of the integrated circuit facing region 154*i* on a side opposite to the light source facing region 154*e* with respect to the integrated circuit facing region 154*i*, and the second coupling region 154*c*2 couples the adjustment region 154*a* and the integrated circuit facing region 154*i*. Therefore, the board 140 can be more stably disposed on the heat sink 150 by interposing the integrated circuit facing region 154*i* having a small width between the light source facing region 154*e* and the adjustment region 154*a* extending in the same direction.

Although the fourth aspect of the present invention has been described by taking the third embodiment as an example, the fourth aspect of the present invention is not limited thereto.

Figure 28:
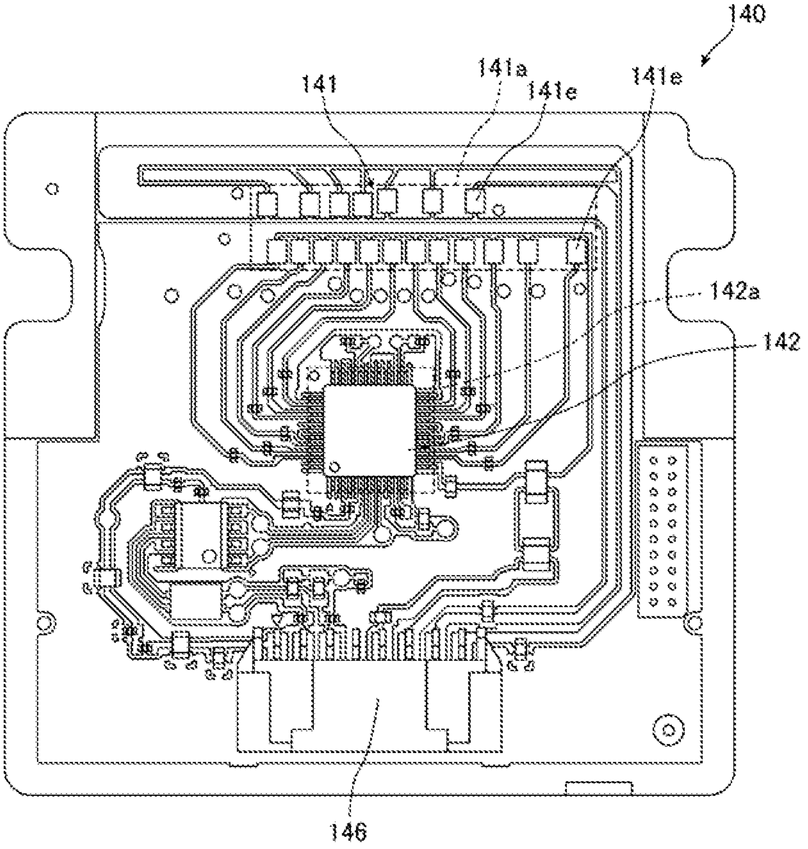
FIG. 28 is a view illustrating a modification of the board.

For example, in the third embodiment, the board 140 including the tail portion 140*t* functioning as the card edge connector is used. However, the fourth aspect of the present invention is not limited thereto, and other boards may be used. FIG. 28 is a view illustrating a modification of the board 140. In a description of the present modification, the same or equivalent constituent elements as those of the third embodiment are denoted by the same reference numerals and an overlapping description will be omitted unless otherwise specified. As illustrated in FIG. 28, a board 140 according to the present modification is different from the board 140 according to the third embodiment in that the board 140 according to the present modification does not include the tail portion 140*t* and includes a socket 146 including a plurality of terminals for inputting power to be supplied to an integrated circuit 142 and each light emitting element 141*e*. In addition, in FIG. 28, the plurality of light emitting elements 141*e* of a light source 141 are arranged in two stages and are arranged in parallel in the left-right direction at each stage. The socket 146 is a conductive member in which a terminal is provided and which supplies power for driving the light source 141. Also in the present modification, the socket 146 is hidden by a lower portion of a plate-shaped cover portion 132*p* of a reflector unit 130. Therefore, also in the example of FIG. 28, a light blocking cover 132 of the reflector unit 130 is positioned between a projection lens 110 and the conductive member that supplies power for driving the light source 141, and protects the conductive member from sunlight incident from the projection lens 110.

Further, in the third embodiment, the configuration in which the light source 141 includes the plurality of light emitting elements 141*e* has been described, but the light source 141 may include a single light emitting element.

According to the first aspect of the present invention, a lamp fitting that easily forms a predetermined light distribution pattern is provided, and can be used in the field of lighting and the like. Furthermore, according to the second aspect of the present invention, a vehicular headlamp capable of reducing the number of components while suppressing deterioration in visibility is provided. According to the third aspect of the present invention, a vehicular headlamp capable of suppressing damage of a conductive member due to sunlight at low cost is provided. According to the fourth aspect of the present invention, a vehicular headlamp capable of efficiently releasing heat is provided, and can be used in the field of automobiles and the like.

The invention claimed is:

1. A lamp fitting, comprising:
- a board on which a light source is mounted;
- a heat sink on which the board is disposed;
- a reflector unit that presses the board against the heat sink and reflects a part of light emitted from the light source; and
- an integrated circuit which is mounted closer to a center of the board than the light source, the integrated circuit configured to adjust power supplied to the light source, wherein
- the board has recesses which are recessed portions of side surfaces located on one side and an other side with respect to the light source,
- the light source is positioned at an inner position with respect to a bottom portion of each of the recesses,
- the reflector unit presses parts of the board that are positioned at outer positions with respect to the bottom portion of each of the recesses;
- the reflector unit presses four parts of the board, two of the four parts being spaced apart from the recess of the side surface located on the one side and sandwiching the recess, and an other two of the four parts being spaced apart from the recess of the side surface located on the other side and sandwiching the recess:

the light source is sandwiched between one of the two of the four parts sandwiching the recess of the side surface located on the one side and one of the other two of the four parts sandwiching the recess of the side surface located on the other side, and the integrated circuit is sandwiched between an other of the two of the four parts sandwiching the recess of the side surface located on the one side and an other of the other two of the four parts sandwiching the recess of the side surface located on the other side; and the other two of the four parts sandwiching the integrated circuit are farther from the recesses than the two of the four parts sandwiching the light source.

2. The lamp fitting according to claim 1, wherein the heat sink has a protrusion inserted into each of the recesses.

3. The lamp fitting according to claim 1, wherein the reflector unit has a flat facing surface facing the board and an opening penetrating from the facing surface to a surface opposite to the board, and the light source overlaps the opening.

* * * * *